(12) United States Patent
Joo et al.

(10) Patent No.: US 9,864,486 B2
(45) Date of Patent: Jan. 9, 2018

(54) MOBILE TERMINAL AND CONTROLLING METHOD THEREOF

(71) Applicant: LG ELECTRONICS INC., Seoul (KR)

(72) Inventors: Jinuh Joo, Seoul (KR); Sanghun Joo, Seoul (KR); Eunshin Kim, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 324 days.

(21) Appl. No.: 14/676,467

(22) Filed: Apr. 1, 2015

(65) Prior Publication Data

US 2015/0370424 A1    Dec. 24, 2015

(30) Foreign Application Priority Data

Jun. 19, 2014    (KR) .................... 10-2014-0074705

(51) Int. Cl.
G06F 3/048 (2013.01)
G06F 3/0482 (2013.01)
G06F 3/0488 (2013.01)
G06F 3/0485 (2013.01)

(52) U.S. Cl.
CPC .......... G06F 3/0482 (2013.01); G06F 3/0485 (2013.01); G06F 3/0488 (2013.01); G06F 3/04883 (2013.01); G06F 2203/04806 (2013.01)

(58) Field of Classification Search
CPC ................................................. G06F 3/0488
USPC ........................................................ 715/830
See application file for complete search history.

(56) References Cited

U.S. PATENT DOCUMENTS

| | | | |
|---|---|---|---|
| 6,121,969 A * | 9/2000 | Jain | G06F 3/04815 382/305 |
| 8,799,820 B2 * | 8/2014 | Pascal | G06Q 10/107 375/240 |
| 9,158,445 B2 * | 10/2015 | Wong | G06F 3/0488 |
| 9,465,521 B1 * | 10/2016 | Giordano | G06F 3/0484 |
| 2006/0230100 A1 * | 10/2006 | Shin | G06F 17/30905 709/203 |
| 2006/0277454 A1 * | 12/2006 | Chen | G06F 17/30056 715/203 |
| 2009/0147297 A1 * | 6/2009 | Stevenson | G06T 11/60 358/1.15 |

(Continued)

OTHER PUBLICATIONS

European Patent Office Application Serial No. 15001030.4, Search Report dated Oct. 22, 2015, 7 pages.

(Continued)

*Primary Examiner* — William Titcomb
(74) *Attorney, Agent, or Firm* — Lee Hong Degerman Kang & Waimey

(57) ABSTRACT

Disclosed are a mobile terminal and controlling method thereof, by which saved image data can be effectively searched. The present invention includes a memory configured to store at least one image data, a touchscreen, and a controller outputting a thumbnail list for the stored image data on a $1^{st}$ scale through the touchscreen, the controller receiving a scroll input to the outputted thumbnail list plural times, the controller, if the scroll input received plural times meets a scale change condition, changing the $1^{st}$ scale of the outputted thumbnail list into a $2^{nd}$ scale.

14 Claims, 16 Drawing Sheets

(56) References Cited

U.S. PATENT DOCUMENTS

| | | | |
|---|---|---|---|
| 2010/0295805 A1* | 11/2010 | Shin | G06F 3/04883 345/173 |
| 2011/0126148 A1 | 5/2011 | Krishnaraj et al. | |
| 2012/0032988 A1 | 2/2012 | Katayama | |
| 2012/0254804 A1* | 10/2012 | Sheha | G06Q 30/02 715/834 |
| 2013/0063492 A1* | 3/2013 | Washington | G09G 5/003 345/660 |
| 2013/0069893 A1* | 3/2013 | Brinda | G06F 3/0488 345/173 |
| 2013/0167055 A1* | 6/2013 | Penev | G06F 3/0482 715/765 |
| 2013/0321340 A1* | 12/2013 | Seo | G06F 1/1641 345/174 |
| 2014/0089832 A1* | 3/2014 | Kim | G06F 3/0481 715/769 |
| 2014/0104210 A1* | 4/2014 | Kim | G06F 3/0488 345/173 |

OTHER PUBLICATIONS

European Patent Office Application Serial No. 15001030.4, Search Report dated Dec. 10, 2015, 12 pages.

\* cited by examiner

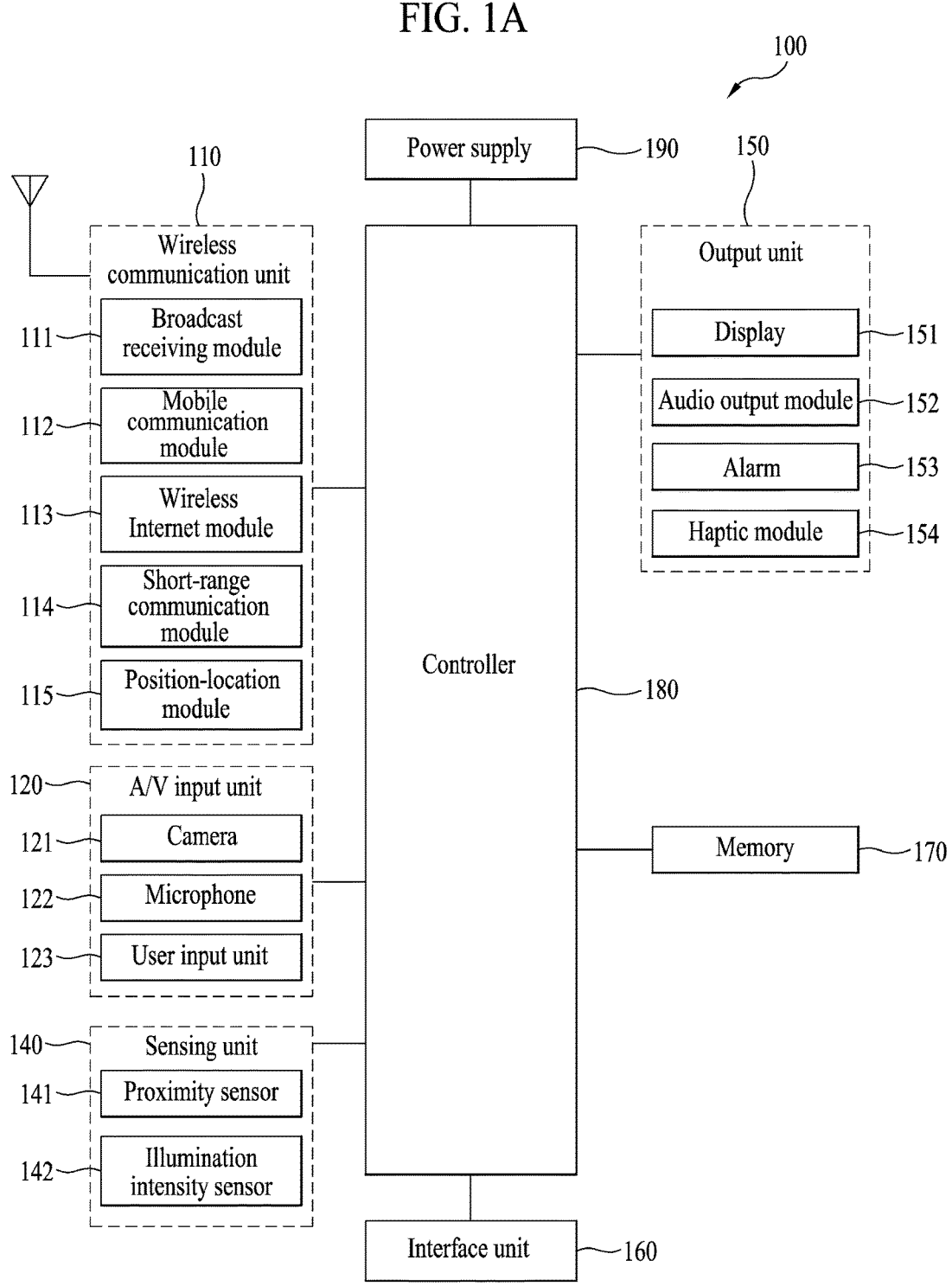

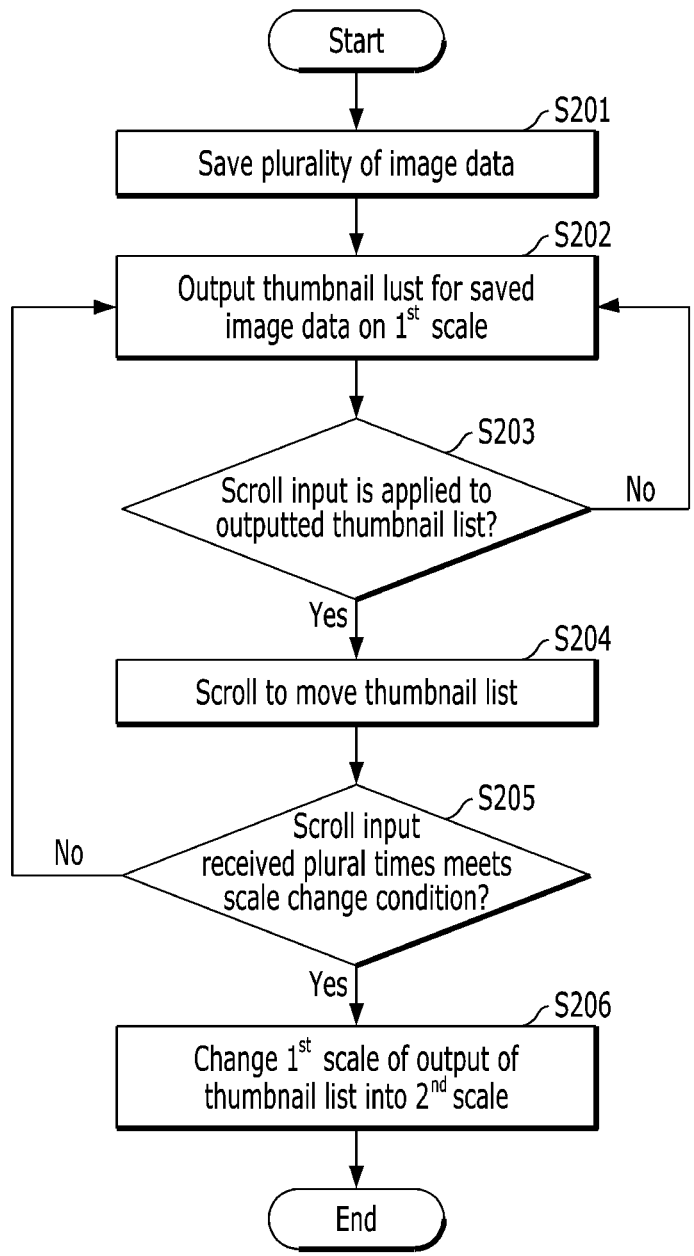

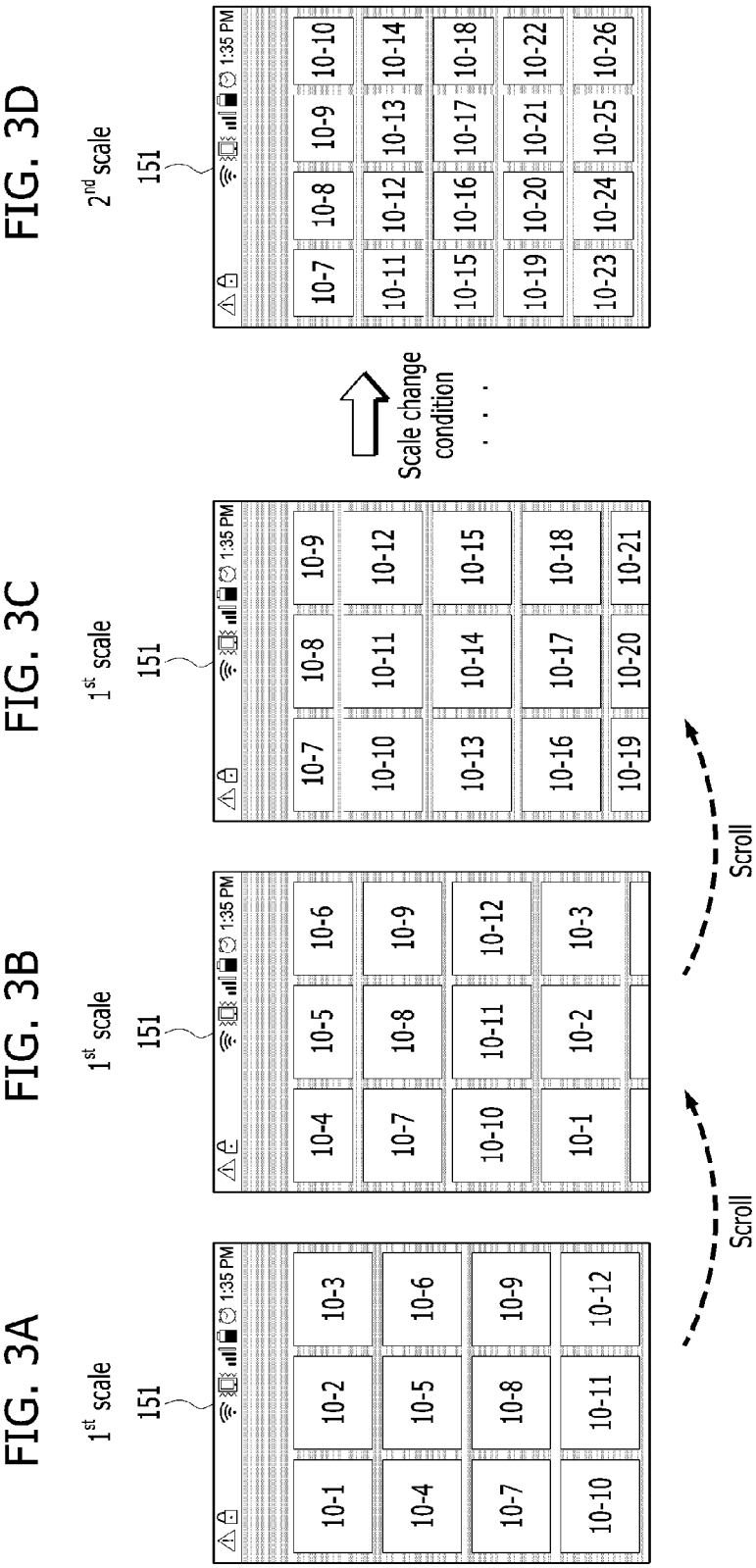

Grouping type

Thumbnail list type

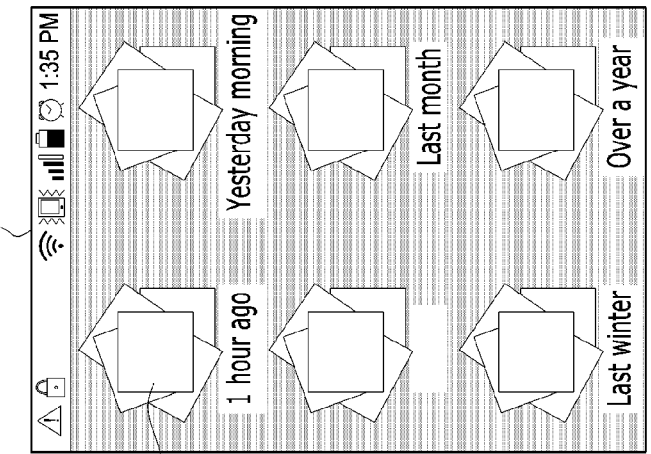
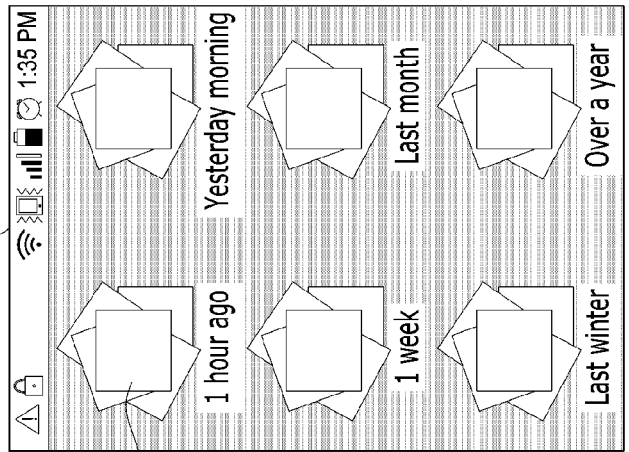

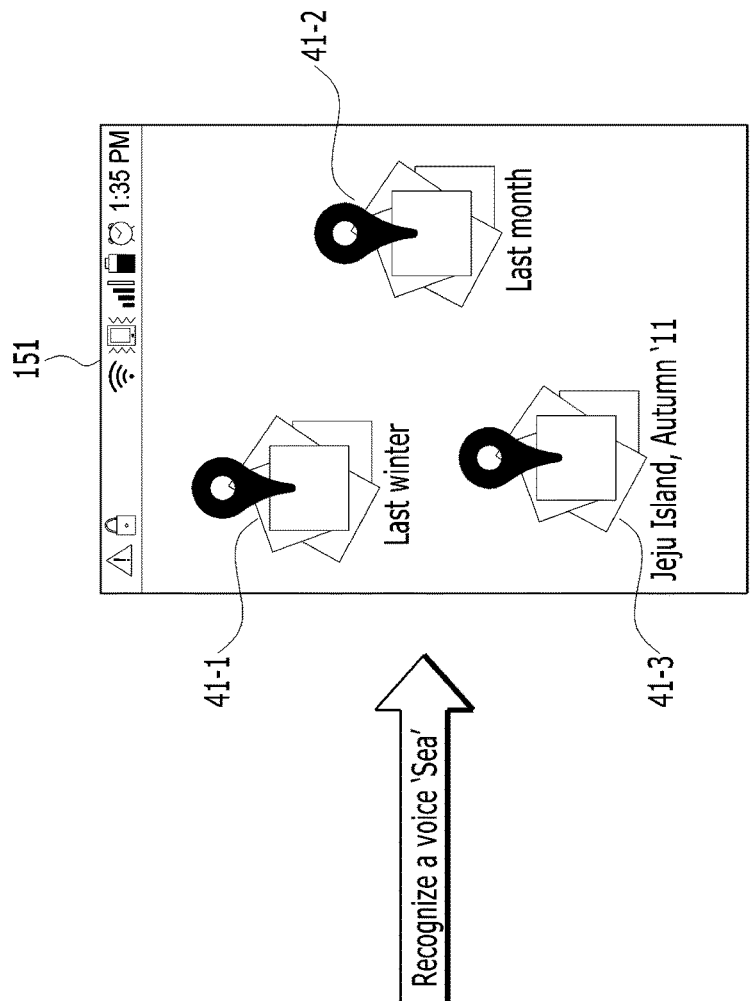
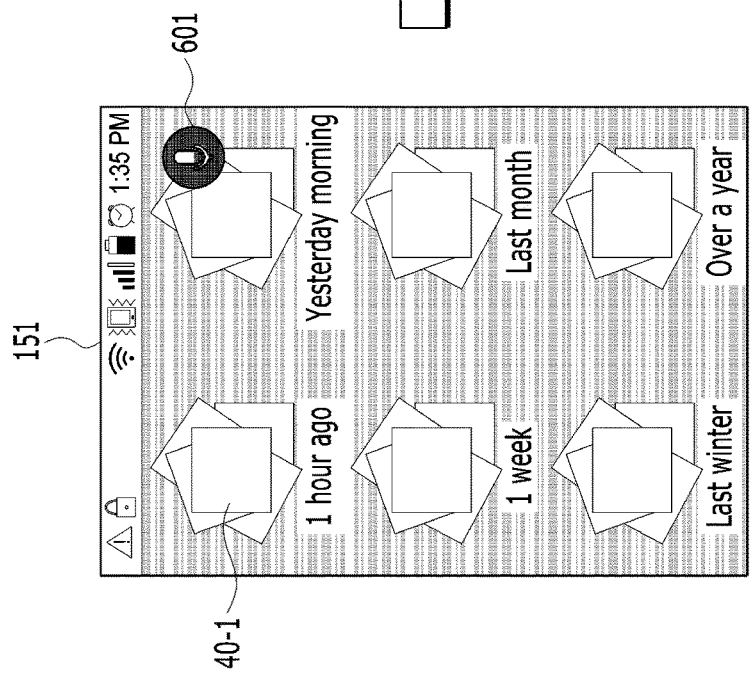

Change into a detailed view of a prescribed image group

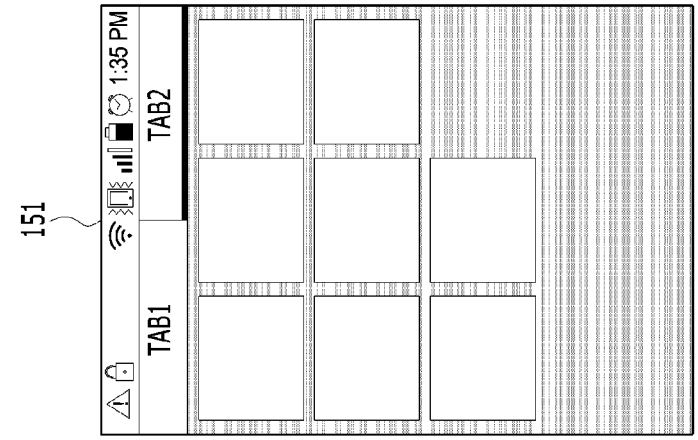
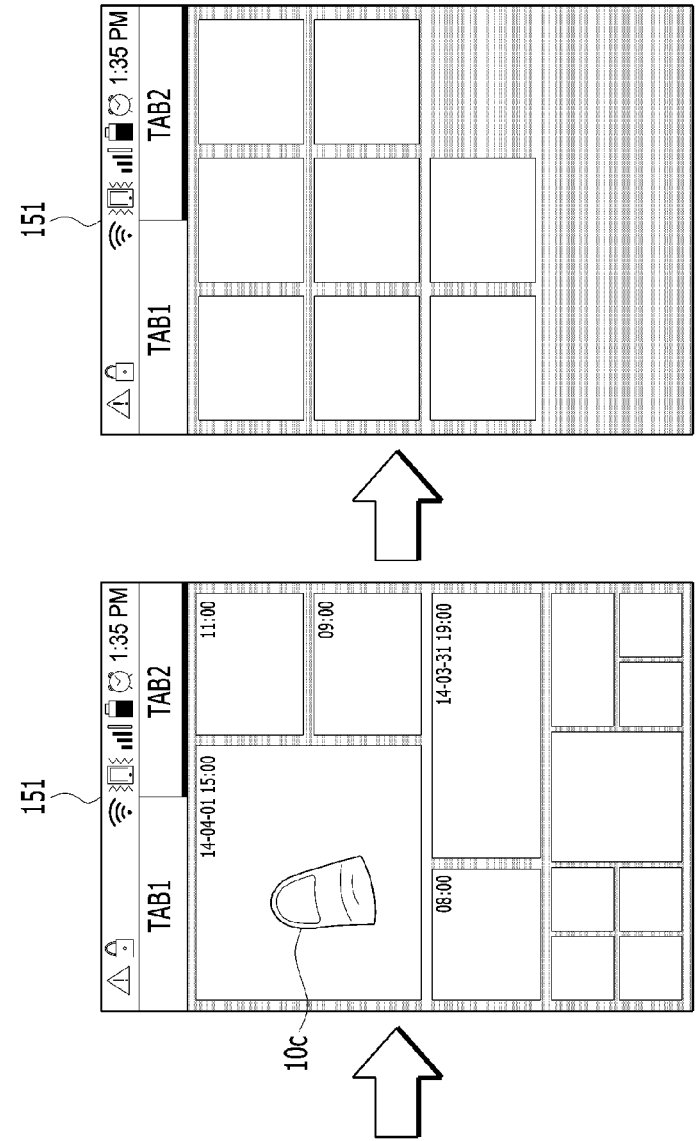
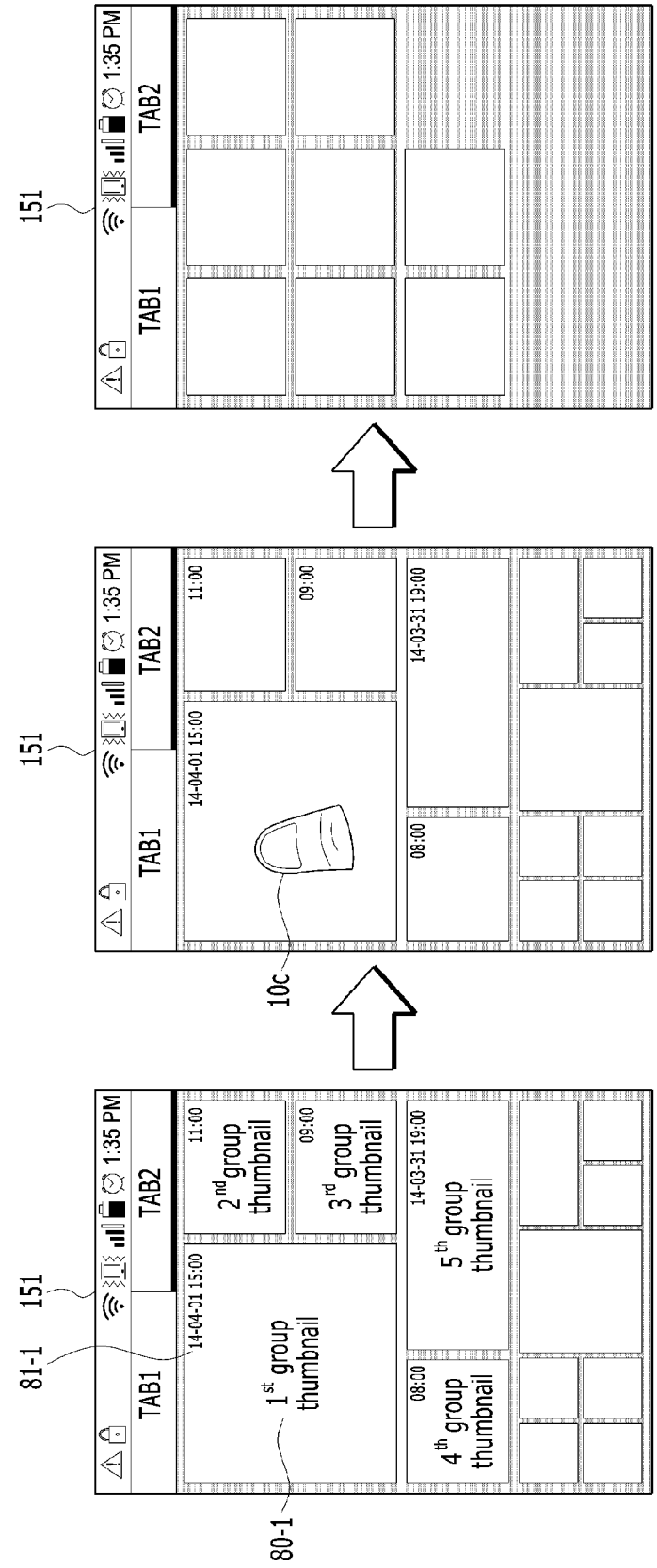

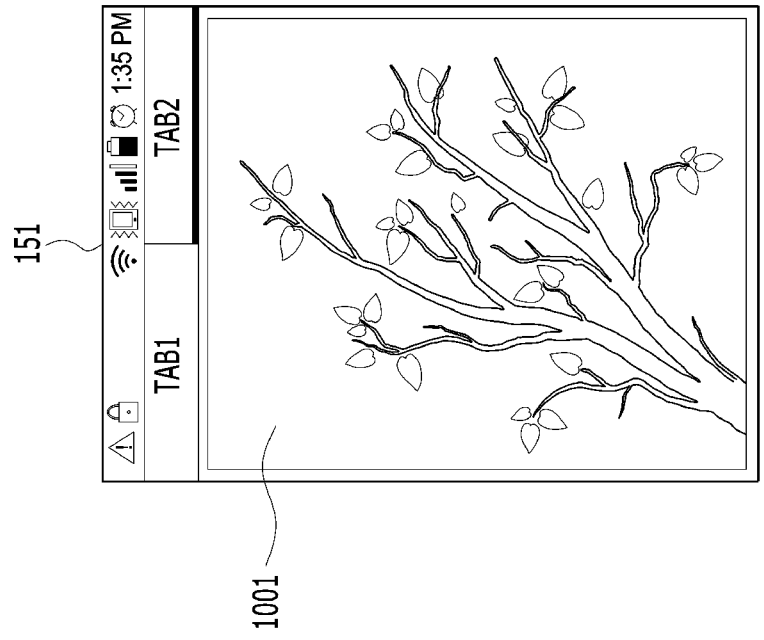
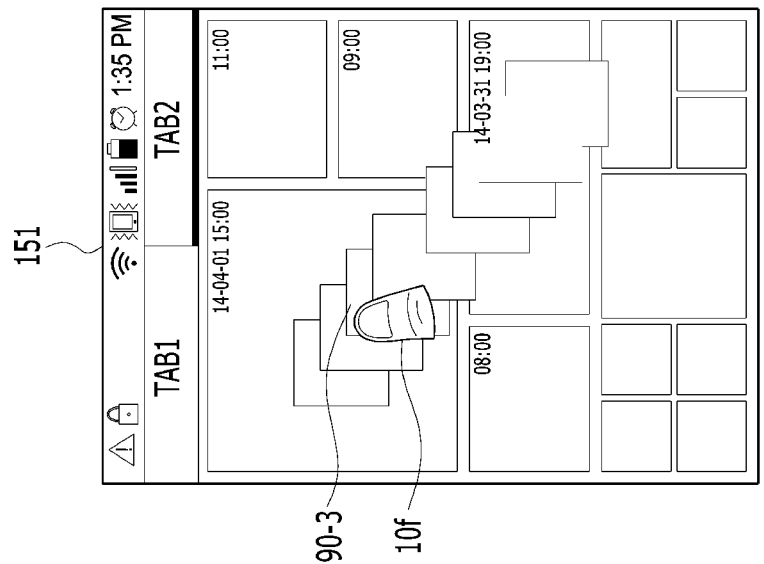

Ronaldo's Portugal sputters in World Cup opener

SALVADOR, Brazil (AP) --

Portugal's start to the World Cup couldn't have been much worse: a 4-0 loss to Germany, a lackluster performance from Cristiano Ronaldo, a key defender sent off and another probably out of the tournament.

The question facing Portugal at the

Scroll

SALVADOR, Brazil (AP) --

Portugal's start to the World Cup couldn't have been much worse: a 4-0 loss to Germany, a lackluster performance from Cristiano Ronaldo, a key defender sent off and another probably out of the tournament.

The question facing Portugal at the championships was always simple: can it win games without Ronaldo at his best?

Grouping condition met

Guts and glory from Klinsmann's brave troops 1202-1

Benzema credits Deschamps for ending his bad spell 1202-2

Algeria coach: Belgium defenders not all Ferraris 1202-3

General list type

Animation effect

Grouping type

MOBILE TERMINAL AND CONTROLLING METHOD THEREOF

Pursuant to 35 U.S.C. §119(a), this application claims the benefit of earlier filing date and right of priority to Korean Application No. 10-2014-0074705, filed on Jun. 19, 2014, the contents of which are hereby incorporated by reference herein in their entirety.

BACKGROUND OF THE INVENTION

Field of the Invention

The present invention relates to a mobile terminal, and more particularly, to a mobile terminal and controlling method thereof. Although the present invention is suitable for a wide scope of applications, it is particularly suitable for facilitating the use of a terminal in further consideration of user's convenience.

Discussion of the Related Art

A mobile terminal is a device which may be configured to perform various functions. Examples of such functions include data and voice communications, capturing images and video via a camera, recording audio, playing music files and outputting music via a speaker system, and displaying images and video on a display. Some terminals include additional functionality which supports game playing, while other terminals are also configured as multimedia players. More recently, mobile terminals have been configured to receive broadcast and multicast signals which permit viewing of contents, such as videos and television programs.

Generally, terminals can be classified into mobile terminals and stationary terminals according to a presence or non-presence of mobility. And, the mobile terminals can be further classified into handheld terminals and vehicle mount terminals according to availability for hand-carry.

There are ongoing efforts to support and increase the functionality of mobile terminals. Such efforts include software and hardware improvements, as well as changes and improvements in the structural components which form the mobile terminal.

A mobile terminal provides a controlling method of saving lots of image data and reading the saved image data. As a controlling method for reading the saved image data, there is a general method described as follows. First of all, a thumbnail list of the saved image data is outputted. Secondly, a user searches for a desired image data through an image preview of thumbnail items. Finally, if a prescribed item (i.e., an image data desired to be found) is selected from the thumbnail list, the image data corresponding to the selected item can be displayed in detail.

However, if the number of the saved image data increases, the above-described method may not be suitable. Therefore, the demand for researching and developing a controlling method for searching image data more effectively is increasingly rising.

SUMMARY OF THE INVENTION

Accordingly, embodiments of the present invention are directed to a mobile terminal and controlling method thereof that substantially obviate one or more problems due to limitations and disadvantages of the related art.

One object of the present invention is to provide a mobile terminal and controlling method thereof, by which image data can be searched easily and conveniently.

Technical tasks obtainable from the present invention are non-limited by the above-mentioned technical tasks. And, other unmentioned technical tasks can be clearly understood from the following description by those having ordinary skill in the technical field to which the present invention pertains.

Additional advantages, objects, and features of the invention will be set forth in the disclosure herein as well as the accompanying drawings. Such aspects may also be appreciated by those skilled in the art based on the disclosure herein.

To achieve these objects and other advantages and in accordance with the purpose of the invention, as embodied and broadly described herein, a mobile terminal according to one embodiment of the present invention may include a memory configured to store at least one image data, a touchscreen, and a controller outputting a thumbnail list for the stored image data on a $1^{st}$ scale through the touchscreen, the controller receiving a scroll input to the outputted thumbnail list plural times, the controller, if the scroll input received plural times meets a scale change condition, changing the $1^{st}$ scale of the outputted thumbnail list into a $2^{nd}$ scale.

Preferably, if a prescribed touch gesture is applied to the outputted thumbnail list, the controller may display a detailed view screen of a group of prescribed image data instead of outputting the thumbnail list.

More preferably, the prescribed touch gesture may include a touch input performed in a manner of applying a touch to a prescribed thumbnail item and then applying a drag in a right-left direction by maintaining the touch.

And, the prescribed image data group may include a set of at least one image data having the same attribute of the touched prescribed thumbnail item.

Preferably, the controller may assign the stored image data to at least one group. If the scroll input received plural times meets a grouping change condition, the controller may output a group list for the at least one group instead of outputting the thumbnail list.

More preferably, if a touch drag input is applied to a prescribed group item of the group list, the controller may display a preview of at least one image data assigned to the prescribed group item on a path of the touch drag input.

More preferably, the grouping change condition may include a condition for additionally meeting the scale change condition during outputting the thumbnail list on a prescribed scale.

Preferably, the scale change condition may include at least one of a condition that a count of receiving the scroll input is equal to or greater than a prescribed count and a condition that a speed of the scroll input is equal to or greater than a prescribed speed.

Preferably, the mobile terminal may further include a camera. If the $1^{st}$ scale of the thumbnail list is changed into the $2^{nd}$ scale, the controller may automatically activate the camera.

Preferably, the mobile terminal may further include a microphone. The controller may recognize a voice received through the microphone. The controller may search for a tag information of the stored image data based on the recognized voice. And, the controller may output the found image data through the touchscreen.

In another aspect of the present invention, as embodied and broadly described herein, a method of controlling a mobile terminal according to another embodiment of the present invention may include the steps of storing at least one image data, outputting a thumbnail list for the stored image data on a $1^{st}$ scale through a touchscreen, receiving a scroll input to the outputted thumbnail list plural times, and if the scroll input received plural times meets a scale change condition, changing the 1$^{st}$ scale of the outputted thumbnail list into a 2$^{nd}$ scale.

Effects obtainable from the present invention may be non-limited by the above mentioned effect. And, other unmentioned effects can be clearly understood from the following description by those having ordinary skill in the technical field to which the present invention pertains.

It is to be understood that both the foregoing general description and the following detailed description of the preferred embodiments of the present invention are exemplary and explanatory and are intended to provide further explanation of the invention as claimed.

BRIEF DESCRIPTION OF THE DRAWINGS

The present invention will become more fully understood from the detailed description given herein below and the accompanying drawings, which are given by illustration only, and thus are not limitative of the present invention, and wherein:

FIG. 1A is a block diagram of a mobile terminal in accordance with the present disclosure;

FIG. 2 is a flowchart for a method of automatically adjusting a scale of a thumbnail list according to one embodiment of the present invention;

FIGS. 3A, 3B, 3C and 3D are state diagrams for a controlling method of automatically adjusting a scale of a thumbnail list according to one embodiment of the present invention;

FIGS. 5A and 5B are diagrams for a controlling method of automatically recognizing a face and then assisting a search of image data through the recognized face according to one embodiment of the present invention;

FIGS. 6A and 6B are diagrams for a controlling method of assisting a search of image data using voice recognition according to one embodiment of the present invention;

FIGS. 8A, 8B and 8C are diagrams for one example of a grouping type list according to one embodiment of the present invention;

FIGS. 10A and 10B are diagrams for a controlling method for a case of selecting a displayed image data according to one embodiment of the present invention;

FIGS. 12A, 12B and 12C are diagrams for a controlling method of changing a scale or display type in response to a scroll input on a news article reading screen according to one embodiment of the present invention;

DETAILED DESCRIPTION OF THE INVENTION

Description will now be given in detail according to exemplary embodiments disclosed herein, with reference to the accompanying drawings. For the sake of brief description with reference to the drawings, the same or equivalent components may be provided with the same reference numbers, and description thereof will not be repeated. In general, a suffix such as "module" and "unit" may be used to refer to elements or components. Use of such a suffix herein is merely intended to facilitate description of the specification, and the suffix itself is not intended to give any special meaning or function. In the present disclosure, that which is well-known to one of ordinary skill in the relevant art has generally been omitted for the sake of brevity. The accompanying drawings are used to help easily understand various technical features and it should be understood that the embodiments presented herein are not limited by the accompanying drawings. As such, the present disclosure should be construed to extend to any alterations, equivalents and substitutes in addition to those which are particularly set out in the accompanying drawings.

It will be understood that although the terms first, second, etc. may be used herein to describe various elements, these elements should not be limited by these terms. These terms are generally only used to distinguish one element from another.

It will be understood that when an element is referred to as being "connected with" another element, the element can be connected with the other element or intervening elements may also be present. In contrast, when an element is referred to as being "directly connected with" another element, there are no intervening elements present.

A singular representation may include a plural representation unless it represents a definitely different meaning from the context. Terms such as "include" or "has" are used herein and should be understood that they are intended to indicate an existence of several components, functions or steps, disclosed in the specification, and it is also understood that greater or fewer components, functions, or steps may likewise be utilized.

Mobile terminals presented herein may be implemented using a variety of different types of terminals. Examples of such terminals include cellular phones, smart phones, user equipment, laptop computers, digital broadcast terminals, personal digital assistants (PDAs), portable multimedia players (PMPs), navigators, portable computers (PCs), slate PCs, tablet PCs, ultra books, wearable devices (for example, smart watches, smart glasses, head mounted displays (HMDs)), and the like.

By way of non-limiting example only, further description will be made with reference to particular types of mobile terminals. However, such teachings apply equally to other types of terminals, such as those types noted above. In addition, these teachings may also be applied to stationary terminals such as digital TV, desktop computers, and the like.

Figure 1B:
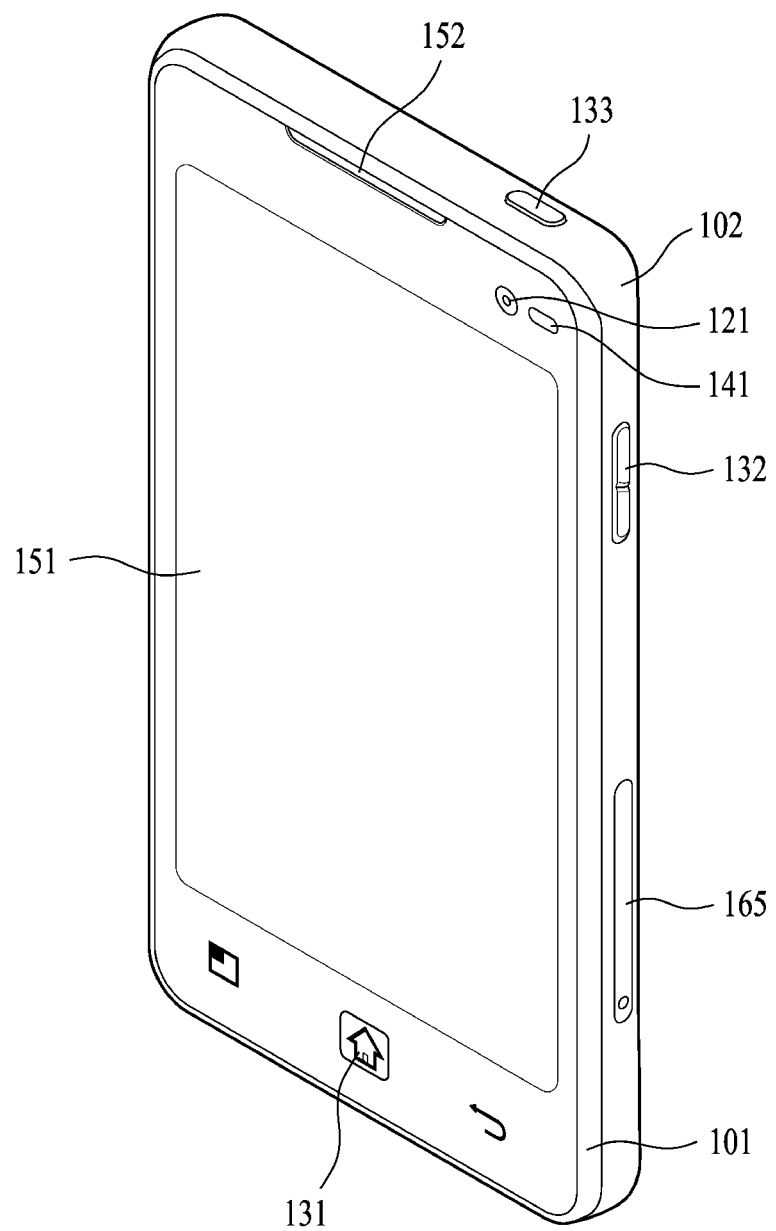
FIGS. 1B and 1C are conceptual views of one example of the mobile terminal, viewed from different directions.
Figure 1C:
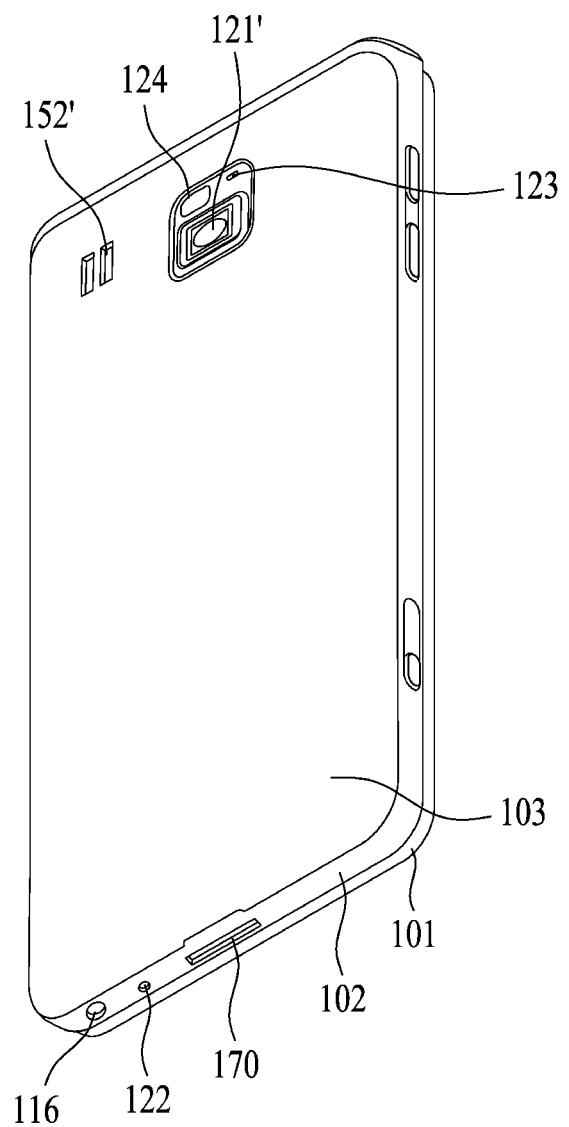

Reference is now made to FIGS. 1A-1C, where FIG. 1A is a block diagram of a mobile terminal in accordance with the present disclosure, and FIGS. 1B and 1C are conceptual views of one example of the mobile terminal, viewed from different directions.

The mobile terminal 100 is shown having components such as a wireless communication unit 110, an input unit 120, a sensing unit 140, an output unit 150, an interface unit 160, a memory 170, a controller 180, and a power supply unit 190. It is understood that implementing all of the illustrated components is not a requirement, and that greater or fewer components may alternatively be implemented.

Referring now to FIG. 1A, the mobile terminal 100 is shown having wireless communication unit 110 configured with several commonly implemented components. For instance, the wireless communication unit 110 typically includes one or more components which permit wireless communication between the mobile terminal 100 and a wireless communication system or network within which the mobile terminal is located.

The wireless communication unit 110 typically includes one or more modules which permit communications such as wireless communications between the mobile terminal 100 and a wireless communication system, communications between the mobile terminal 100 and another mobile terminal, communications between the mobile terminal 100 and an external server. Further, the wireless communication unit 110 typically includes one or more modules which connect the mobile terminal 100 to one or more networks. To facilitate such communications, the wireless communication unit 110 includes one or more of a broadcast receiving module 111, a mobile communication module 112, a wireless Internet module 113, a short-range communication module 114, and a location information module 115.

The input unit 120 includes a camera 121 for obtaining images or video, a microphone 122, which is one type of audio input device for inputting an audio signal, and a user input unit 123 (for example, a touch key, a push key, a mechanical key, a soft key, and the like) for allowing a user to input information. Data (for example, audio, video, image, and the like) is obtained by the input unit 120 and may be analyzed and processed by controller 180 according to device parameters, user commands, and combinations thereof.

The sensing unit 140 is typically implemented using one or more sensors configured to sense internal information of the mobile terminal, the surrounding environment of the mobile terminal, user information, and the like. For example, in FIG. 1A, the sensing unit 140 is shown having a proximity sensor 141 and an illumination sensor 142.

If desired, the sensing unit 140 may alternatively or additionally include other types of sensors or devices, such as a touch sensor, an acceleration sensor, a magnetic sensor, a G-sensor, a gyroscope sensor, a motion sensor, an RGB sensor, an infrared (IR) sensor, a finger scan sensor, a ultrasonic sensor, an optical sensor (for example, camera 121), a microphone 122, a battery gauge, an environment sensor (for example, a barometer, a hygrometer, a thermometer, a radiation detection sensor, a thermal sensor, and a gas sensor, among others), and a chemical sensor (for example, an electronic nose, a health care sensor, a biometric sensor, and the like), to name a few. The mobile terminal 100 may be configured to utilize information obtained from sensing unit 140, and in particular, information obtained from one or more sensors of the sensing unit 140, and combinations thereof.

The output unit 150 is typically configured to output various types of information, such as audio, video, tactile output, and the like. The output unit 150 is shown having a display unit 151, an audio output module 152, a haptic module 153, and an optical output module 154.

The display unit 151 may have an inter-layered structure or an integrated structure with a touch sensor in order to facilitate a touch screen. The touch screen may provide an output interface between the mobile terminal 100 and a user, as well as function as the user input unit 123 which provides an input interface between the mobile terminal 100 and the user.

The interface unit 160 serves as an interface with various types of external devices that can be coupled to the mobile terminal 100. The interface unit 160, for example, may include any of wired or wireless ports, external power supply ports, wired or wireless data ports, memory card ports, ports for connecting a device having an identification module, audio input/output (I/O) ports, video I/O ports, earphone ports, and the like. In some cases, the mobile terminal 100 may perform assorted control functions associated with a connected external device, in response to the external device being connected to the interface unit 160.

The memory 170 is typically implemented to store data to support various functions or features of the mobile terminal 100. For instance, the memory 170 may be configured to store application programs executed in the mobile terminal 100, data or instructions for operations of the mobile terminal 100, and the like. Some of these application programs may be downloaded from an external server via wireless communication. Other application programs may be installed within the mobile terminal 100 at time of manufacturing or shipping, which is typically the case for basic functions of the mobile terminal 100 (for example, receiving a call, placing a call, receiving a message, sending a message, and the like). It is common for application programs to be stored in the memory 170, installed in the mobile terminal 100, and executed by the controller 180 to perform an operation (or function) for the mobile terminal 100.

The controller 180 typically functions to control overall operation of the mobile terminal 100, in addition to the operations associated with the application programs. The controller 180 may provide or process information or functions appropriate for a user by processing signals, data, information and the like, which are input or output by the various components depicted in FIG. 1A, or activating application programs stored in the memory 170. As one example, the controller 180 controls some or all of the components illustrated in FIGS. 1A-1C according to the execution of an application program that have been stored in the memory 170.

The power supply unit 190 can be configured to receive external power or provide internal power in order to supply appropriate power required for operating elements and components included in the mobile terminal 100. The power supply unit 190 may include a battery, and the battery may be configured to be embedded in the terminal body, or configured to be detachable from the terminal body.

Referring still to FIG. 1A, various components depicted in this figure will now be described in more detail. Regarding the wireless communication unit 110, the broadcast receiving module 111 is typically configured to receive a broadcast signal and/or broadcast associated information from an external broadcast managing entity via a broadcast channel. The broadcast channel may include a satellite channel, a terrestrial channel, or both. In some embodiments, two or more broadcast receiving modules 111 may be utilized to facilitate simultaneously receiving of two or more broadcast channels, or to support switching among broadcast channels.

The mobile communication module 112 can transmit and/or receive wireless signals to and from one or more network entities. Typical examples of a network entity include a base station, an external mobile terminal, a server, and the like. Such network entities form part of a mobile communication network, which is constructed according to technical standards or communication methods for mobile communications (for example, Global System for Mobile Communication (GSM), Code Division Multi Access (CDMA), CDMA2000 (Code Division Multi Access 2000), EV-DO (Enhanced Voice-Data Optimized or Enhanced Voice-Data Only), Wideband CDMA (WCDMA), High Speed Downlink Packet access (HSDPA), HSUPA (High Speed Uplink Packet Access), Long Term Evolution (LTE), LTE-A (Long Term Evolution-Advanced), and the like). Examples of wireless signals transmitted and/or received via the mobile communication module 112 include audio call signals, video (telephony) call signals, or various formats of data to support communication of text and multimedia messages.

The wireless Internet module 113 is configured to facilitate wireless Internet access. This module may be internally or externally coupled to the mobile terminal 100. The wireless Internet module 113 may transmit and/or receive wireless signals via communication networks according to wireless Internet technologies.

Examples of such wireless Internet access include Wireless LAN (WLAN), Wireless Fidelity (Wi-Fi), Wi-Fi Direct, Digital Living Network Alliance (DLNA), Wireless Broadband (WiBro), Worldwide Interoperability for Microwave Access (WiMAX), High Speed Downlink Packet Access (HSDPA), HSUPA (High Speed Uplink Packet Access), Long Term Evolution (LTE), LTE-A (Long Term Evolution-Advanced), and the like. The wireless Internet module 113 may transmit/receive data according to one or more of such wireless Internet technologies, and other Internet technologies as well.

In some embodiments, when the wireless Internet access is implemented according to, for example, WiBro, HSDPA, HSUPA, GSM, CDMA, WCDMA, LTE, LTE-A and the like, as part of a mobile communication network, the wireless Internet module 113 performs such wireless Internet access. As such, the Internet module 113 may cooperate with, or function as, the mobile communication module 112.

The short-range communication module 114 is configured to facilitate short-range communications. Suitable technologies for implementing such short-range communications include BLUETOOTH™, Radio Frequency IDentification (RFID), Infrared Data Association (IrDA), Ultra-WideBand (UWB), ZigBee, Near Field Communication (NFC), Wireless-Fidelity (Wi-Fi), Wi-Fi Direct, Wireless USB (Wireless Universal Serial Bus), and the like. The short-range communication module 114 in general supports wireless communications between the mobile terminal 100 and a wireless communication system, communications between the mobile terminal 100 and another mobile terminal 100, or communications between the mobile terminal and a network where another mobile terminal 100 (or an external server) is located, via wireless area networks. One example of the wireless area networks is a wireless personal area networks.

In some embodiments, another mobile terminal (which may be configured similarly to mobile terminal 100) may be a wearable device, for example, a smart watch, a smart glass or a head mounted display (HMD), which is able to exchange data with the mobile terminal 100 (or otherwise cooperate with the mobile terminal 100). The short-range communication module 114 may sense or recognize the wearable device, and permit communication between the wearable device and the mobile terminal 100. In addition, when the sensed wearable device is a device which is authenticated to communicate with the mobile terminal 100, the controller 180, for example, may cause transmission of data processed in the mobile terminal 100 to the wearable device via the short-range communication module 114. Hence, a user of the wearable device may use the data processed in the mobile terminal 100 on the wearable device. For example, when a call is received in the mobile terminal 100, the user may answer the call using the wearable device. Also, when a message is received in the mobile terminal 100, the user can check the received message using the wearable device.

The location information module 115 is generally configured to detect, calculate, derive or otherwise identify a position of the mobile terminal. As an example, the location information module 115 includes a Global Position System (GPS) module, a Wi-Fi module, or both. If desired, the location information module 115 may alternatively or additionally function with any of the other modules of the wireless communication unit 110 to obtain data related to the position of the mobile terminal.

As one example, when the mobile terminal uses a GPS module, a position of the mobile terminal may be acquired using a signal sent from a GPS satellite. As another example, when the mobile terminal uses the Wi-Fi module, a position of the mobile terminal can be acquired based on information related to a wireless access point (AP) which transmits or receives a wireless signal to or from the Wi-Fi module.

The input unit 120 may be configured to permit various types of input to the mobile terminal 120. Examples of such input include audio, image, video, data, and user input. Image and video input is often obtained using one or more cameras 121. Such cameras 121 may process image frames of still pictures or video obtained by image sensors in a video or image capture mode. The processed image frames can be displayed on the display unit 151 or stored in memory 170. In some cases, the cameras 121 may be arranged in a matrix configuration to permit a plurality of images having various angles or focal points to be input to the mobile terminal 100. As another example, the cameras 121 may be located in a stereoscopic arrangement to acquire left and right images for implementing a stereoscopic image.

The microphone 122 is generally implemented to permit audio input to the mobile terminal 100. The audio input can be processed in various manners according to a function being executed in the mobile terminal 100. If desired, the microphone 122 may include assorted noise removing algorithms to remove unwanted noise generated in the course of receiving the external audio.

The user input unit 123 is a component that permits input by a user. Such user input may enable the controller 180 to control operation of the mobile terminal 100. The user input unit 123 may include one or more of a mechanical input element (for example, a key, a button located on a front and/or rear surface or a side surface of the mobile terminal 100, a dome switch, a jog wheel, a jog switch, and the like), or a touch-sensitive input, among others. As one example, the touch-sensitive input may be a virtual key or a soft key, which is displayed on a touch screen through software processing, or a touch key which is located on the mobile terminal at a location that is other than the touch screen. On the other hand, the virtual key or the visual key may be displayed on the touch screen in various shapes, for example, graphic, text, icon, video, or a combination thereof.

The sensing unit 140 is generally configured to sense one or more of internal information of the mobile terminal, surrounding environment information of the mobile terminal, user information, or the like. The controller 180 generally cooperates with the sending unit 140 to control operation of the mobile terminal 100 or execute data processing, a function or an operation associated with an application program installed in the mobile terminal based on the sensing provided by the sensing unit 140. The sensing unit 140 may be implemented using any of a variety of sensors, some of which will now be described in more detail.

The proximity sensor 141 may include a sensor to sense presence or absence of an object approaching a surface, or an object located near a surface, by using an electromagnetic field, infrared rays, or the like without a mechanical contact. The proximity sensor 141 may be arranged at an inner region of the mobile terminal covered by the touch screen, or near the touch screen.

The proximity sensor 141, for example, may include any of a transmissive type photoelectric sensor, a direct reflective type photoelectric sensor, a mirror reflective type photoelectric sensor, a high-frequency oscillation proximity sensor, a capacitance type proximity sensor, a magnetic type proximity sensor, an infrared rays proximity sensor, and the like. When the touch screen is implemented as a capacitance type, the proximity sensor 141 can sense proximity of a pointer relative to the touch screen by changes of an electromagnetic field, which is responsive to an approach of an object with conductivity. In this case, the touch screen (touch sensor) may also be categorized as a proximity sensor.

The term "proximity touch" will often be referred to herein to denote the scenario in which a pointer is positioned to be proximate to the touch screen without contacting the touch screen. The term "contact touch" will often be referred to herein to denote the scenario in which a pointer makes physical contact with the touch screen. For the position corresponding to the proximity touch of the pointer relative to the touch screen, such position will correspond to a position where the pointer is perpendicular to the touch screen. The proximity sensor 141 may sense proximity touch, and proximity touch patterns (for example, distance, direction, speed, time, position, moving status, and the like).

In general, controller 180 processes data corresponding to proximity touches and proximity touch patterns sensed by the proximity sensor 141, and cause output of visual information on the touch screen. In addition, the controller 180 can control the mobile terminal 100 to execute different operations or process different data according to whether a touch with respect to a point on the touch screen is either a proximity touch or a contact touch.

A touch sensor can sense a touch applied to the touch screen, such as display unit 151, using any of a variety of touch methods. Examples of such touch methods include a resistive type, a capacitive type, an infrared type, and a magnetic field type, among others.

As one example, the touch sensor may be configured to convert changes of pressure applied to a specific part of the display unit 151, or convert capacitance occurring at a specific part of the display unit 151, into electric input signals. The touch sensor may also be configured to sense not only a touched position and a touched area, but also touch pressure and/or touch capacitance. A touch object is generally used to apply a touch input to the touch sensor. Examples of typical touch objects include a finger, a touch pen, a stylus pen, a pointer, or the like.

When a touch input is sensed by a touch sensor, corresponding signals may be transmitted to a touch controller. The touch controller may process the received signals, and then transmit corresponding data to the controller 180. Accordingly, the controller 180 may sense which region of the display unit 151 has been touched. Here, the touch controller may be a component separate from the controller 180, the controller 180, and combinations thereof.

In some embodiments, the controller 180 may execute the same or different controls according to a type of touch object that touches the touch screen or a touch key provided in addition to the touch screen. Whether to execute the same or different control according to the object which provides a touch input may be decided based on a current operating state of the mobile terminal 100 or a currently executed application program, for example.

The touch sensor and the proximity sensor may be implemented individually, or in combination, to sense various types of touches. Such touches includes a short (or tap) touch, a long touch, a multi-touch, a drag touch, a flick touch, a pinch-in touch, a pinch-out touch, a swipe touch, a hovering touch, and the like.

If desired, an ultrasonic sensor may be implemented to recognize position information relating to a touch object using ultrasonic waves. The controller 180, for example, may calculate a position of a wave generation source based on information sensed by an illumination sensor and a plurality of ultrasonic sensors. Since light is much faster than ultrasonic waves, the time for which the light reaches the optical sensor is much shorter than the time for which the ultrasonic wave reaches the ultrasonic sensor. The position of the wave generation source may be calculated using this fact. For instance, the position of the wave generation source may be calculated using the time difference from the time that the ultrasonic wave reaches the sensor based on the light as a reference signal.

The camera 121 typically includes at least one a camera sensor (CCD, CMOS etc.), a photo sensor (or image sensors), and a laser sensor.

Implementing the camera 121 with a laser sensor may allow detection of a touch of a physical object with respect to a 3D stereoscopic image. The photo sensor may be laminated on, or overlapped with, the display device. The photo sensor may be configured to scan movement of the physical object in proximity to the touch screen. In more detail, the photo sensor may include photo diodes and transistors at rows and columns to scan content received at the photo sensor using an electrical signal which changes according to the quantity of applied light. Namely, the photo sensor may calculate the coordinates of the physical object according to variation of light to thus obtain position information of the physical object.

The display unit 151 is generally configured to output information processed in the mobile terminal 100. For example, the display unit 151 may display execution screen information of an application program executing at the mobile terminal 100 or user interface (UI) and graphic user interface (GUI) information in response to the execution screen information.

In some embodiments, the display unit 151 may be implemented as a stereoscopic display unit for displaying stereoscopic images. A typical stereoscopic display unit may employ a stereoscopic display scheme such as a stereoscopic scheme (a glass scheme), an auto-stereoscopic scheme (glassless scheme), a projection scheme (holographic scheme), or the like.

The audio output module 152 is generally configured to output audio data. Such audio data may be obtained from any of a number of different sources, such that the audio data may be received from the wireless communication unit 110 or may have been stored in the memory 170. The audio data may be output during modes such as a signal reception mode, a call mode, a record mode, a voice recognition mode, a broadcast reception mode, and the like. The audio output module 152 can provide audible output related to a particular function (e.g., a call signal reception sound, a message reception sound, etc.) performed by the mobile terminal 100. The audio output module 152 may also be implemented as a receiver, a speaker, a buzzer, or the like.

A haptic module 153 can be configured to generate various tactile effects that a user feels, perceive, or otherwise experience. A typical example of a tactile effect generated by the haptic module 153 is vibration. The strength, pattern and the like of the vibration generated by the haptic module 153 can be controlled by user selection or setting by the controller. For example, the haptic module 153 may output different vibrations in a combining manner or a sequential manner.

Besides vibration, the haptic module 153 can generate various other tactile effects, including an effect by stimulation such as a pin arrangement vertically moving to contact skin, a spray force or suction force of air through a jet orifice or a suction opening, a touch to the skin, a contact of an electrode, electrostatic force, an effect by reproducing the sense of cold and warmth using an element that can absorb or generate heat, and the like.

The haptic module 153 can also be implemented to allow the user to feel a tactile effect through a muscle sensation such as the user's fingers or arm, as well as transferring the tactile effect through direct contact. Two or more haptic modules 153 may be provided according to the particular configuration of the mobile terminal 100.

An optical output module 154 can output a signal for indicating an event generation using light of a light source. Examples of events generated in the mobile terminal 100 may include message reception, call signal reception, a missed call, an alarm, a schedule notice, an email reception, information reception through an application, and the like.

A signal output by the optical output module 154 may be implemented in such a manner that the mobile terminal emits monochromatic light or light with a plurality of colors. The signal output may be terminated as the mobile terminal senses that a user has checked the generated event, for example.

The interface unit 160 serves as an interface for external devices to be connected with the mobile terminal 100. For example, the interface unit 160 can receive data transmitted from an external device, receive power to transfer to elements and components within the mobile terminal 100, or transmit internal data of the mobile terminal 100 to such external device. The interface unit 160 may include wired or wireless headset ports, external power supply ports, wired or wireless data ports, memory card ports, ports for connecting a device having an identification module, audio input/output (I/O) ports, video I/O ports, earphone ports, or the like.

The identification module may be a chip that stores various information for authenticating authority of using the mobile terminal 100 and may include a user identity module (UIM), a subscriber identity module (SIM), a universal subscriber identity module (USIM), and the like. In addition, the device having the identification module (also referred to herein as an "identifying device") may take the form of a smart card. Accordingly, the identifying device can be connected with the mobile terminal 100 via the interface unit 160.

When the mobile terminal 100 is connected with an external cradle, the interface unit 160 can serve as a passage to allow power from the cradle to be supplied to the mobile terminal 100 or may serve as a passage to allow various command signals input by the user from the cradle to be transferred to the mobile terminal there through. Various command signals or power input from the cradle may operate as signals for recognizing that the mobile terminal is properly mounted on the cradle.

The memory 170 can store programs to support operations of the controller 180 and store input/output data (for example, phonebook, messages, still images, videos, etc.). The memory 170 may store data related to various patterns of vibrations and audio which are output in response to touch inputs on the touch screen.

The memory 170 may include one or more types of storage mediums including a Flash memory, a hard disk, a solid state disk, a silicon disk, a multimedia card micro type, a card-type memory (e.g., SD or DX memory, etc), a Random Access Memory (RAM), a Static Random Access Memory (SRAM), a Read-Only Memory (ROM), an Electrically Erasable Programmable Read-Only Memory (EEPROM), a Programmable Read-Only memory (PROM), a magnetic memory, a magnetic disk, an optical disk, and the like. The mobile terminal 100 may also be operated in relation to a network storage device that performs the storage function of the memory 170 over a network, such as the Internet.

The controller 180 may typically control the general operations of the mobile terminal 100. For example, the controller 180 may set or release a lock state for restricting a user from inputting a control command with respect to applications when a status of the mobile terminal meets a preset condition.

The controller 180 can also perform the controlling and processing associated with voice calls, data communications, video calls, and the like, or perform pattern recognition processing to recognize a handwriting input or a picture drawing input performed on the touch screen as characters or images, respectively. In addition, the controller 180 can control one or a combination of those components in order to implement various exemplary embodiments disclosed herein.

The power supply unit 190 receives external power or provide internal power and supply the appropriate power required for operating respective elements and components included in the mobile terminal 100. The power supply unit 190 may include a battery, which is typically rechargeable or be detachably coupled to the terminal body for charging.

The power supply unit 190 may include a connection port. The connection port may be configured as one example of the interface unit 160 to which an external charger for supplying power to recharge the battery is electrically connected.

As another example, the power supply unit 190 may be configured to recharge the battery in a wireless manner without use of the connection port. In this example, the power supply unit 190 can receive power, transferred from an external wireless power transmitter, using at least one of an inductive coupling method which is based on magnetic induction or a magnetic resonance coupling method which is based on electromagnetic resonance.

Various embodiments described herein may be implemented in a computer-readable medium, a machine-readable medium, or similar medium using, for example, software, hardware, or any combination thereof.

Referring now to FIGS. 1B and 1C, the mobile terminal 100 is described with reference to a bar-type terminal body. However, the mobile terminal 100 may alternatively be implemented in any of a variety of different configurations. Examples of such configurations include watch-type, clip-type, glasses-type, or as a folder-type, flip-type, slide-type, swing-type, and swivel-type in which two and more bodies are combined with each other in a relatively movable manner, and combinations thereof. Discussion herein will often relate to a particular type of mobile terminal (for example, bar-type, watch-type, glasses-type, and the like). However, such teachings with regard to a particular type of mobile terminal will generally apply to other types of mobile terminals as well.

The mobile terminal 100 will generally include a case (for example, frame, housing, cover, and the like) forming the appearance of the terminal. In this embodiment, the case is formed using a front case 101 and a rear case 102. Various electronic components are incorporated into a space formed between the front case 101 and the rear case 102. At least one middle case may be additionally positioned between the front case 101 and the rear case 102.

The display unit 151 is shown located on the front side of the terminal body to output information. As illustrated, a window 151a of the display unit 151 may be mounted to the front case 101 to form the front surface of the terminal body together with the front case 101.

In some embodiments, electronic components may also be mounted to the rear case 102. Examples of such electronic components include a detachable battery 191, an identification module, a memory card, and the like. Rear cover 103 is shown covering the electronic components, and this cover may be detachably coupled to the rear case 102. Therefore, when the rear cover 103 is detached from the rear case 102, the electronic components mounted to the rear case 102 are externally exposed.

As illustrated, when the rear cover 103 is coupled to the rear case 102, a side surface of the rear case 102 is partially exposed. In some cases, upon the coupling, the rear case 102 may also be completely shielded by the rear cover 103. In some embodiments, the rear cover 103 may include an opening for externally exposing a camera 121b or an audio output module 152b.

The cases 101, 102, 103 may be formed by injection-molding synthetic resin or may be formed of a metal, for example, stainless steel (STS), aluminum (Al), titanium (Ti), or the like.

As an alternative to the example in which the plurality of cases form an inner space for accommodating components, the mobile terminal 100 may be configured such that one case forms the inner space. In this example, a mobile terminal 100 having a uni-body is formed in such a manner that synthetic resin or metal extends from a side surface to a rear surface.

If desired, the mobile terminal 100 may include a waterproofing unit (not shown) for preventing introduction of water into the terminal body. For example, the waterproofing unit may include a waterproofing member which is located between the window 151a and the front case 101, between the front case 101 and the rear case 102, or between the rear case 102 and the rear cover 103, to hermetically seal an inner space when those cases are coupled.

FIGS. 1B and 1C depict certain components as arranged on the mobile terminal. However, it is to be understood that alternative arrangements are possible and within the teachings of the instant disclosure. Some components may be omitted or rearranged. For example, the first manipulation unit 123a may be located on another surface of the terminal body, and the second audio output module 152b may be located on the side surface of the terminal body.

The display unit 151 outputs information processed in the mobile terminal 100. The display unit 151 may be implemented using one or more suitable display devices. Examples of such suitable display devices include a liquid crystal display (LCD), a thin film transistor-liquid crystal display (TFT-LCD), an organic light emitting diode (OLED), a flexible display, a 3-dimensional (3D) display, an e-ink display, and combinations thereof.

The display unit 151 may be implemented using two display devices, which can implement the same or different display technology. For instance, a plurality of the display units 151 may be arranged on one side, either spaced apart from each other, or these devices may be integrated, or these devices may be arranged on different surfaces.

The display unit 151 may also include a touch sensor which senses a touch input received at the display unit. When a touch is input to the display unit 151, the touch sensor may be configured to sense this touch and the controller 180, for example, may generate a control command or other signal corresponding to the touch. The content which is input in the touching manner may be a text or numerical value, or a menu item which can be indicated or designated in various modes.

The touch sensor may be configured in a form of a film having a touch pattern, disposed between the window 151a and a display on a rear surface of the window 151a, or a metal wire which is patterned directly on the rear surface of the window 151a. Alternatively, the touch sensor may be integrally formed with the display. For example, the touch sensor may be disposed on a substrate of the display or within the display.

The display unit 151 may also form a touch screen together with the touch sensor. Here, the touch screen may serve as the user input unit 123 (see FIG. 1A). Therefore, the touch screen may replace at least some of the functions of the first manipulation unit 123a.

The first audio output module 152a may be implemented in the form of a speaker to output voice audio, alarm sounds, multimedia audio reproduction, and the like.

The window 151a of the display unit 151 will typically include an aperture to permit audio generated by the first audio output module 152a to pass. One alternative is to allow audio to be released along an assembly gap between the structural bodies (for example, a gap between the window 151a and the front case 101). In this case, a hole independently formed to output audio sounds may not be seen or is otherwise hidden in terms of appearance, thereby further simplifying the appearance and manufacturing of the mobile terminal 100.

The optical output module 154 can be configured to output light for indicating an event generation. Examples of such events include a message reception, a call signal reception, a missed call, an alarm, a schedule notice, an email reception, information reception through an application, and the like. When a user has checked a generated event, the controller can control the optical output unit 154 to stop the light output.

The first camera 121a can process image frames such as still or moving images obtained by the image sensor in a capture mode or a video call mode. The processed image frames can then be displayed on the display unit 151 or stored in the memory 170.

The first and second manipulation units 123a and 123b are examples of the user input unit 123, which may be manipulated by a user to provide input to the mobile terminal 100. The first and second manipulation units 123a and 123b may also be commonly referred to as a manipulating portion, and may employ any tactile method that allows the user to perform manipulation such as touch, push, scroll, or the like. The first and second manipulation units 123a and 123b may also employ any non-tactile method that allows the user to perform manipulation such as proximity touch, hovering, or the like.

FIG. 1B illustrates the first manipulation unit 123a as a touch key, but possible alternatives include a mechanical key, a push key, a touch key, and combinations thereof.

Input received at the first and second manipulation units 123a and 123b may be used in various ways. For example, the first manipulation unit 123a may be used by the user to provide an input to a menu, home key, cancel, search, or the like, and the second manipulation unit 123b may be used by the user to provide an input to control a volume level being output from the first or second audio output modules 152a or 152b, to switch to a touch recognition mode of the display unit 151, or the like.

As another example of the user input unit 123, a rear input unit (not shown) may be located on the rear surface of the terminal body. The rear input unit can be manipulated by a user to provide input to the mobile terminal 100. The input may be used in a variety of different ways. For example, the rear input unit may be used by the user to provide an input for power on/off, start, end, scroll, control volume level being output from the first or second audio output modules 152a or 152b, switch to a touch recognition mode of the display unit 151, and the like. The rear input unit may be configured to permit touch input, a push input, or combinations thereof.

The rear input unit may be located to overlap the display unit 151 of the front side in a thickness direction of the terminal body. As one example, the rear input unit may be located on an upper end portion of the rear side of the terminal body such that a user can easily manipulate it using a forefinger when the user grabs the terminal body with one hand. Alternatively, the rear input unit can be positioned at most any location of the rear side of the terminal body.

Embodiments that include the rear input unit may implement some or all of the functionality of the first manipulation unit 123a in the rear input unit. As such, in situations where the first manipulation unit 123a is omitted from the front side, the display unit 151 can have a larger screen.

As a further alternative, the mobile terminal 100 may include a finger scan sensor which scans a user's fingerprint. The controller 180 can then use fingerprint information sensed by the finger scan sensor as part of an authentication procedure. The finger scan sensor may also be installed in the display unit 151 or implemented in the user input unit 123.

The microphone 122 is shown located at an end of the mobile terminal 100, but other locations are possible. If desired, multiple microphones may be implemented, with such an arrangement permitting the receiving of stereo sounds.

The interface unit 160 may serve as a path allowing the mobile terminal 100 to interface with external devices. For example, the interface unit 160 may include one or more of a connection terminal for connecting to another device (for example, an earphone, an external speaker, or the like), a port for near field communication (for example, an Infrared Data Association (IrDA) port, a Bluetooth port, a wireless LAN port, and the like), or a power supply terminal for supplying power to the mobile terminal 100. The interface unit 160 may be implemented in the form of a socket for accommodating an external card, such as Subscriber Identification Module (SIM), User Identity Module (UIM), or a memory card for information storage.

The second camera 121b is shown located at the rear side of the terminal body and includes an image capturing direction that is substantially opposite to the image capturing direction of the first camera unit 121a. If desired, second camera 121a may alternatively be located at other locations, or made to be moveable, in order to have a different image capturing direction from that which is shown.

The second camera 121b can include a plurality of lenses arranged along at least one line. The plurality of lenses may also be arranged in a matrix configuration. The cameras may be referred to as an "array camera." When the second camera 121b is implemented as an array camera, images may be captured in various manners using the plurality of lenses and images with better qualities.

As shown in FIG. 1C, a flash 124 is shown adjacent to the second camera 121b. When an image of a subject is captured with the camera 121b, the flash 124 may illuminate the subject.

As shown in FIG. 1B, the second audio output module 152b can be located on the terminal body. The second audio output module 152b may implement stereophonic sound functions in conjunction with the first audio output module 152a, and may be also used for implementing a speaker phone mode for call communication.

At least one antenna for wireless communication may be located on the terminal body. The antenna may be installed in the terminal body or formed by the case. For example, an antenna which configures a part of the broadcast receiving module 111 may be retractable into the terminal body. Alternatively, an antenna may be formed using a film attached to an inner surface of the rear cover 103, or a case that includes a conductive material.

A power supply unit 190 for supplying power to the mobile terminal 100 may include a battery 191, which is mounted in the terminal body or detachably coupled to an outside of the terminal body. The battery 191 may receive power via a power source cable connected to the interface unit 160. Also, the battery 191 can be recharged in a wireless manner using a wireless charger. Wireless charging may be implemented by magnetic induction or electromagnetic resonance.

The rear cover 103 is shown coupled to the rear case 102 for shielding the battery 191, to prevent separation of the battery 191, and to protect the battery 191 from an external impact or from foreign material. When the battery 191 is detachable from the terminal body, the rear case 103 may be detachably coupled to the rear case 102.

An accessory for protecting an appearance or assisting or extending the functions of the mobile terminal 100 can also be provided on the mobile terminal 100. As one example of an accessory, a cover or pouch for covering or accommodating at least one surface of the mobile terminal 100 may be provided. The cover or pouch may cooperate with the display unit 151 to extend the function of the mobile terminal 100. Another example of the accessory is a touch pen for assisting or extending a touch input to a touch screen.

Further preferred embodiments will be described in more detail with reference to additional drawing figures. It is understood by those skilled in the art that the present features can be embodied in several forms without departing from the characteristics thereof.

If a numerous number of image data are saved in a mobile terminal, it may not be easy for a user to find a desired image data quickly. The reason for this is that it is not easy to search for an image data through a search word. Hence, as a general controlling method of a mobile terminal to read photos, there is a method of outputting a thumbnail list of a plurality of image data saved in a mobile terminal.

If a user watches each thumbnail item included in the thumbnail list, the user may search for a desired image by obtaining an image roughly.

Yet, although the thumbnail list may be better than a method of reading an individual image, limitations are put on reading image data through the thumbnail list.

According to one embodiment of the present invention, proposed is a method of appropriately utilizing a thumbnail list, which is further advanced than a controlling method of simply outputting a thumbnail list.

Controlling methods according to the present invention are described in detail with reference to the accompanying drawings as follows.

FIG. 2 is a flowchart for a method of automatically adjusting a scale of a thumbnail list according to one embodiment of the present invention. And, FIGS. 3A to 3D are state diagrams for a controlling method of automatically adjusting a scale of a thumbnail list according to one embodiment of the present invention. The present invention is described in detail with reference to FIG. 2 and FIGS. 3A to 3D as follows.

First of all, a thumbnail list for image data means that each item of a list for image data is displayed as a small preview screen (hereinafter named a thumbnail), as shown in FIGS. 3A to 3D, and may have a lattice structure. In the thumbnail list, the number of images possibly existing on a single line (e.g., 1 row in a thumbnail list of a lattice structure) may vary depending on a size of a displayed thumbnail. For instance, if 4 thumbnails, each of which is displayed by 100 pixels, are displayed on a single line, 8 thumbnails, each of which is displayed by 50 pixels, may be displayed on a single line. Moreover, since the number of images existing in a single column may vary depending on a size of a displayed thumbnail, the number of images displayable on a single screen may vary eventually. In the following detailed description and claims, an extent related to how many thumbnails are displayable on a single screen shall be named a scale. In particular, if the number of thumbnails displayed on a single screen is large, it may mean a large scale. On the other hand, if the number of thumbnails displayed on a single screen is small, it may mean a small scale.

In a step S201, the controller 180 saves a plurality of image data in the memory 170. In a step S202, the controller 180 outputs a thumbnail list for a plurality of the saved image data on a $1^{st}$ scale. Referring to FIGS. 3A to 3D, the thumbnail list is outputted on the $1^{st}$ scale [FIG. 3A, FIG. 3B, FIG. 3C], while the thumbnail list is outputted on a $2^{nd}$ scale [FIG. 3D].

The thumbnail list shown in FIG. 3A includes a plurality of thumbnail items 10-1 to 10-12.

According to one embodiment of the present invention, in case that a scroll input is received from a user several times, it is proposed to automatically change a scale of a thumbnail list. The reason for this is that, when many scrolls should be performed to find a desired image, finding the desired image can be further facilitated if a scale gets smaller. In particular, the number of thumbnails displayed on a single screen can further increase if a scale gets smaller. Hence, image data can be easily found through scale adjustment. Thus, a controlling method according to one embodiment of the present invention proposes a scale to be changed by a user's scroll input only. Such a condition for changing a scale shall be named a scale change condition.

Meanwhile, according to the above description, a scale change condition includes a case that a scroll input is applied several times for example, by which the present invention is non-limited. For instance, the scale change condition may include a case that a scroll speed is equal to or greater than a prescribed speed.

In a step S203, the controller 180 waits for a reception of a scroll input to the outputted thumbnail list. If the scroll input is not received, the controller 180 can go back to the step S202. If the scroll input is received, the controller 180 can proceed to a step S204.

In the step S204, the controller 180 can move to display the displayed thumbnail list. Referring to FIGS. 3A to 3C, if a scroll input is received plural times from a user, it can be observed that the thumbnail items displayed through the thumbnail list are changed from the thumbnail items 10-1 to 10-12 into the thumbnail items 10-7 to 10-21 in response to the received scroll input.

In a step S205, the controller 180 determines whether the received scroll input received plural times meets the scale change condition. As mentioned in the foregoing description, the schedule change condition may include a condition for a count of receptions of the scroll input and/or a condition for a scale speed. For instance, the scale change condition may include a condition of inputting a scroll input 3 times at least, a condition that a scroll speed is equal to or greater than a predetermined sped, or a combination thereof.

Referring to FIG. 3C and FIG. 3D, when a scroll input is received, if a scale change condition is met, the controller 180 can display the thumbnail list in a manner of changing a scale of the displayed thumbnail list into a $2^{nd}$ scale from a $1^{st}$ scale. On the $2^{nd}$ scale, 20 thumbnail items are displayed on a single screen of the thumbnail list.

As other scroll inputs keep being received on the $2^{nd}$ scale, if the scale change condition is met again, the $2^{nd}$ scale can be changed into a $3^{rd}$ scale, a $4^{th}$ scale or the like in sequence.

As the scale is sequentially changed, as mentioned in the above description, if the scale of the thumbnail list further increases, a size of each thumbnail item further decreases inevitably. Hence, if the scale of the thumbnail list increases over a prescribed scale, a size of each thumbnail item becomes too small such that a user is unable to distinguish an image through the corresponding thumbnail item. In order to compensate such a problem, according to one embodiment of the present invention, it is proposed to automatically group a plurality of images together on a prescribed scale or higher. Such an embodiment is described in detail with reference to FIGS. 4A to 4C as follows.

Figure 4C:
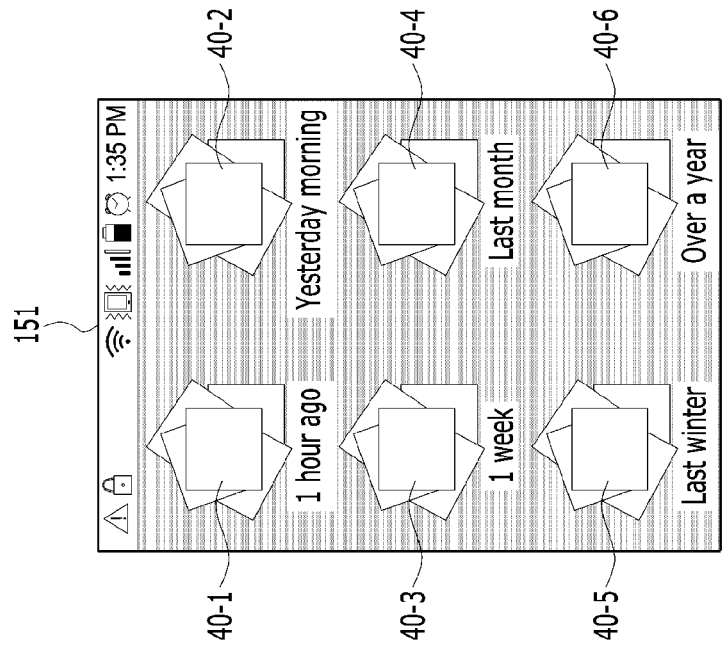
FIGS. 4A, 4B and 4C are diagrams for one example of automatically changing a display type of scale list into a grouping type list according to one embodiment of the present invention.
Figure 4B:
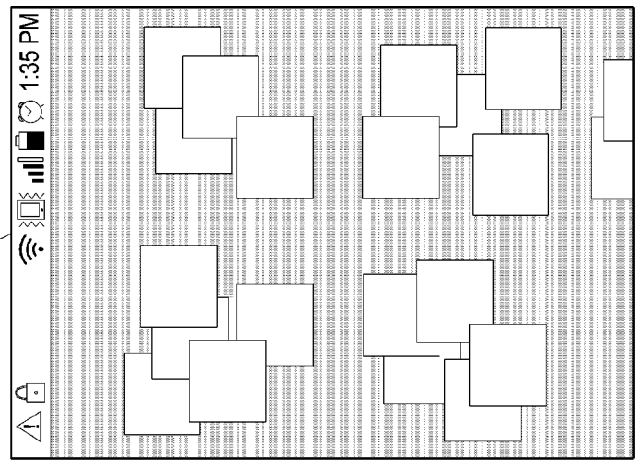
Figure 4A:
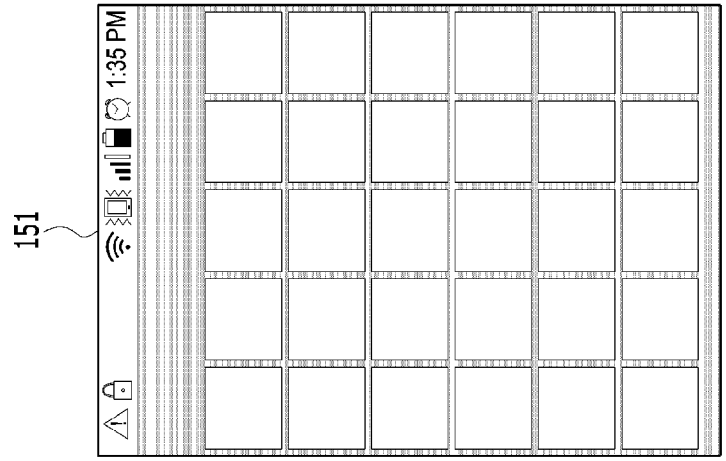

FIGS. 4A, 4B and 4C are diagrams for one example of automatically changing a display type of scale list into a grouping type list according to one embodiment of the present invention.

As mentioned in the foregoing description, if a scale of a thumbnail list gets equal to or greater than a prescribed scale, it is disadvantageous in that a user has difficulty in checking a thumbnail item. Hence, if a scale change condition keeps being met during a display on a prescribed threshold scale, the controller 180 stops changing the scale and is able to change a thumbnail list type into a grouping type list. In this case, the grouping type list means a type as follows. Namely, a plurality of image data are assigned to a single group and represented through a list of representative thumbnails or folders for the respective groups.

Referring to FIG. 4A, a thumbnail list represented on a threshold scale is displayed. In doing so, if a grouping change condition is met, the controller 180 can output a grouping type list, as shown in FIG. 4C, instead of outputting the thumbnail list of a thumbnail list type. In the grouping type list, the grouped image data can be displayed as $1^{st}$ to $6^{th}$ folders 40-1 to 40-6.

The grouping change condition means a condition for changing a thumbnail type list into a grouping type list. For one detailed example, while a thumbnail list is displayed on a prescribed threshold scale, the grouping change condition may include a case that the scale change condition is met.

As the grouping change condition is met, if the thumbnail list is changed into the grouping type list, the controller 180 can represent a case that a plurality of thumbnail items are trouped in the thumbnail list type as an animation effect [cf. FIG. 4B].

Meanwhile, the grouping of the image data may be performed on various conditions. For instance, in case that photographing is performed several times in a camera activated state, data of taken images can be assigned as a single group. Moreover, grouping may be performed with reference to a date or a geographical place of the photographing (using a location determination of a mobile terminal with GPS). According to one embodiment of the present invention, a reference for the grouping may be non-limited.

Meanwhile, according to one embodiment of the present invention, an additional search assist method is proposed as well as a controlling method of scale adjustment and a controlling method of changing a display into a grouping type list. For detailed examples, provided are a method of searching for an image using a face recognition result from recognizing a face automatically and a search method using a voice command received from a user. A detailed embodiment for such a method is described in detail with reference to FIGS. 5A and 5B as follows.

FIGS. 5A and 5B are diagrams for a controlling method of automatically recognizing a face and then assisting a search of image data through the recognized face according to one embodiment of the present invention.

According to the example shown in FIG. 5A, the mobile terminal 100 currently outputs image data as a grouping type list. The controller 180 activates a camera in advance and is then proposed to recognize a face in the activated state. The reason for this is described as follows. First of all, the controller 180 recognizes that a user's face approaches. Secondly, if the user's face approaches, it is proposed to search/filter image data using the recognized face.

In particular, in the state shown in FIG. 5A, the controller 180 recognizes a user's face through a camera activated already. If the recognized face gets closer over a prescribed distance (or, if a size of the recognized face gets greater than a prescribed size), the controller 180 can perform a search/filtering on the saved image data using the recognized face. Subsequently, referring to FIG. 5B, the controller 180 is able to output the grouping type list using the searched/filtered image data.

According to the above-described embodiment, the camera is activated in advance. Meanwhile, according to one embodiment of the present invention, further provided is an appropriate timing for activate a camera.

In general, if a camera is activated, a power for analyzing image data received through a camera module may be required as well as a power for operating the corresponding module itself. If these powers are consumed for an unnecessary case, it may cause an unnecessary waste of a power. Hence, according to one embodiment of the present invention, regarding an appropriate timing for activating a camera, it is proposed to activate the camera if a scale is changed to be equal to or greater than a prescribed scale. The reason for this is that if a scale is changed to be equal to or greater than a prescribed scale, a different method may be required as well as a finding method through a thumbnail list.

Thus, on a scale change condition, in case of a display on a scale equal to or greater than a prescribed scale, the controller 180 can recognize a user's face by activating a camera.

In the following description, a method of assisting a search for image data using voice recognition is proposed and described with reference to FIGS. 6A and 6B.

FIGS. 6A and 6B are diagrams for a controlling method of assisting a search for image data using voice recognition according to one embodiment of the present invention.

According to the example shown in FIG. 6A, the mobile terminal 100 currently outputs image data as a grouping type list. The controller 180 activates voice recognition in advance and is then proposed to recognize a voice using the recognized voice In particular, in the state shown in FIG. 6A, the controller 180 recognizes a user's voice through a microphone activated already and is then able to perform a search/filtering on the saved image data using the recognized voice. Subsequently, referring to FIG. 6B, the controller 180 is able to output the grouping type list using the searched/filtered image data.

Moreover, according to one embodiment of the present invention, proposed is a detailed search method based on the recognized voice.

First of all, if a prescribed search word is inputted through the voice recognition, the controller 180 can search tag information of image data. In particular, if the prescribed search word includes a search word indicating a specific place or location, the controller 180 can search location information tags of the image data. In more particular, if a search word 'sea' is recognized, the controller 180 searches the location information tags of the image data for an image data photographed nearby the sea and is then able to provide the found image data.

Meanwhile, according to one embodiment of the present invention, while a thumbnail list is outputted, it is proposed to output a detailed image data in response to an input of a prescribed touch gesture. Such an embodiment is described in detail with reference to FIGS. 7A and 7B as follows.

Figure 7B:
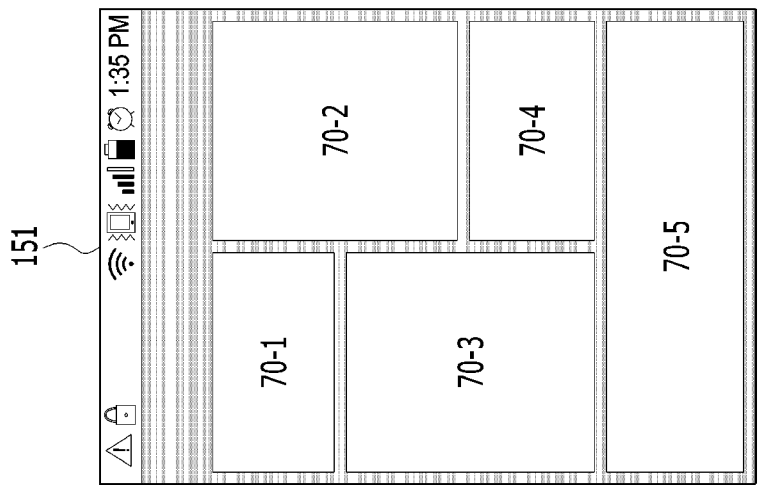
FIGS. 7A and 7B are diagrams for a controlling method of outputting a detailed image data in the course of outputting a thumbnail list according to one embodiment of the present invention.
Figure 7A:
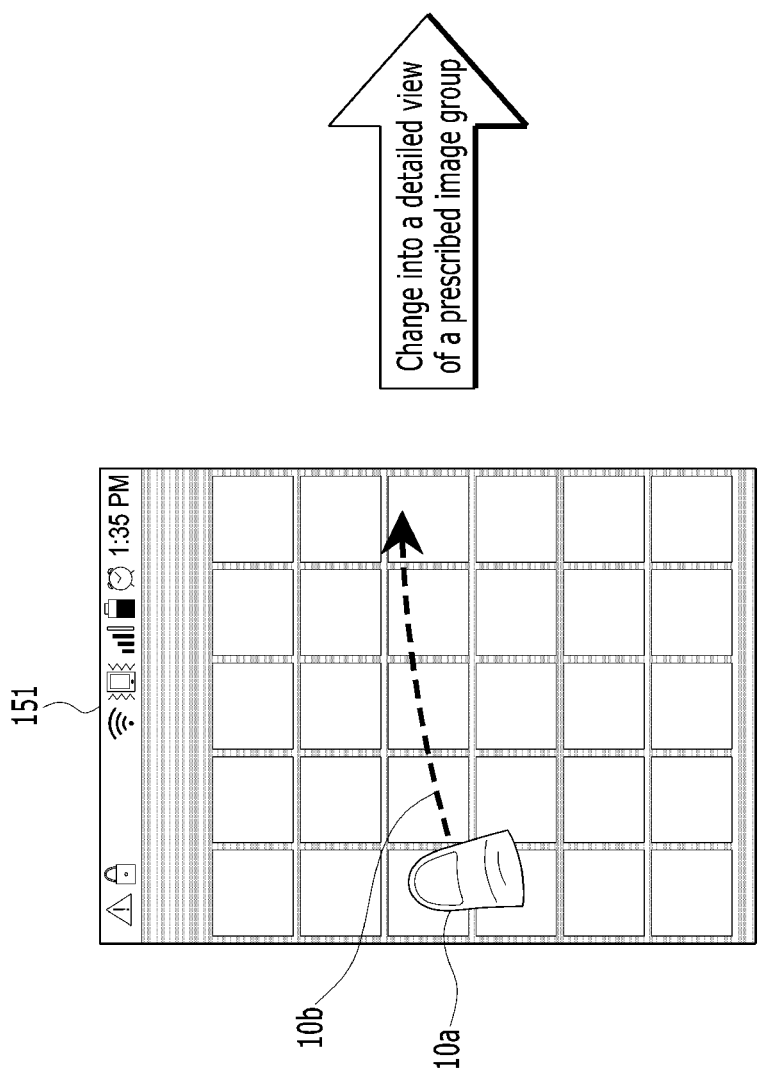

FIGS. 7A and 7B are diagrams for a controlling method of outputting a detailed image data in the course of outputting a thumbnail list according to one embodiment of the present invention.

Referring to FIG. 7A, the mobile terminal 100 currently outputs a thumbnail list on a prescribed scale through the touch screen 151. The greater a scale of the thumbnail list gets, the smaller a size of each thumbnail item becomes. Hence, it is disadvantageous in that a user is unable to clearly confirm a detailed image data. Therefore, according to one embodiment of the present invention, proposed is a controlling method of confirming a detailed image data in response to an input of a prescribed touch gesture of a user.

While the thumbnail list is outputted, if the controller 180 receives an input of applying a touch 10a to a prescribed point and then applying a drag 10b in a left-to-right direction by maintaining the touch 10a [FIG. 7A], the controller 180 can output a screen for reading image data in detail instead of outputting the thumbnail list [FIG. 7B]. In particular, a plurality of the displayed image data shown in FIG. 7B may include a plurality of image data associated with the point of the touch 10a (e.g., a plurality of the image data associated with thumbnail item selected by the touch 10a, a plurality of the image data having the same attribute of the selected thumbnail item, etc.). For instance, if the touch 10a is applied to a prescribed thumbnail item, the controller 180 can provide a reading screen for the image data grouped with the prescribed thumbnail item. In particular, the controller 180 can output a detailed view screen of a group corresponding to the prescribed thumbnail.

The image data having the same attribute of the selected thumbnail item may mean image data having tag information of the same photographing date, time or place of the selected thumbnail item.

According to the foregoing embodiments, the grouping type list is described. Another example of the grouping type list is described in detail with reference to FIGS. 8A to 8C as follows.

FIGS. 8A, 8B and 8C are diagrams for one example of a grouping type list according to one embodiment of the present invention.

Referring to FIG. 8A, each item of a grouping type list can indicate a group thumbnail that represents each group. And, group thumbnails may have different sizes, respectively. Moreover, each of the group thumbnails can include a preview of a representative image data among a plurality of image data included in the corresponding group of a combination of previews of a plurality of image data. The representative image data may include one of an image data having a highest number of hits, a latest image data and an image data having the largest tagging information, among images belonging to a corresponding group.

A size of a group thumbnail may be determined by various references. For instance, a group having more tagged information may have a greater size of a group thumbnail. For another instance, a size of a group thumbnail may differ depending on the number of images included in a corresponding group. For further instance, a size of a group thumbnail may increase in proportion to the number of hits of an image included in a corresponding group.

Each group thumbnail may include a photographing date and/or time information 81-1 on a plurality of image data included in the corresponding group thumbnail.

In case that a $1^{st}$ group thumbnail 80-1 is selected [FIG. 8B], it is able to output a thumbnail list for a plurality of image data included in the selected $1^{st}$ group thumbnail [FIG. 8C].

Thus, if a prescribed group thumbnail is selected, it is able to read a plurality of image data belonging to a corresponding group. Yet, since a display type of the image data is changed, it may cause inconvenience to a user. Therefore, according to one embodiment of the present invention, proposed as a simple controlling method is a controlling method of reading image data included in a group thumbnail. Such an embodiment is described in detail with reference to FIGS. 9A to 9C as follows.

Figure 9C:
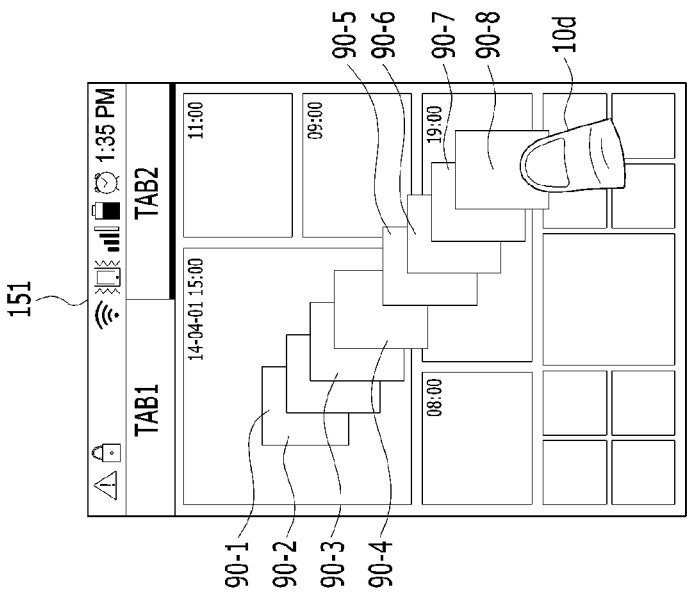
FIGS. 9A, 9B and 9C are diagrams for a controlling method of easily reading image data included in a group thumbnail according to one embodiment of the present invention.
Figure 9B:
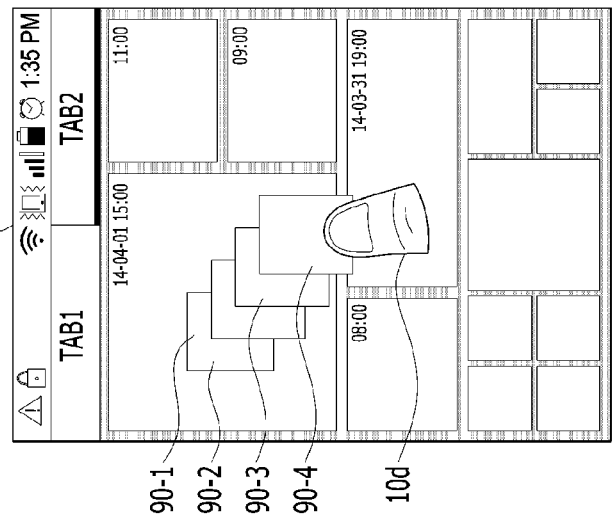
Figure 9A:
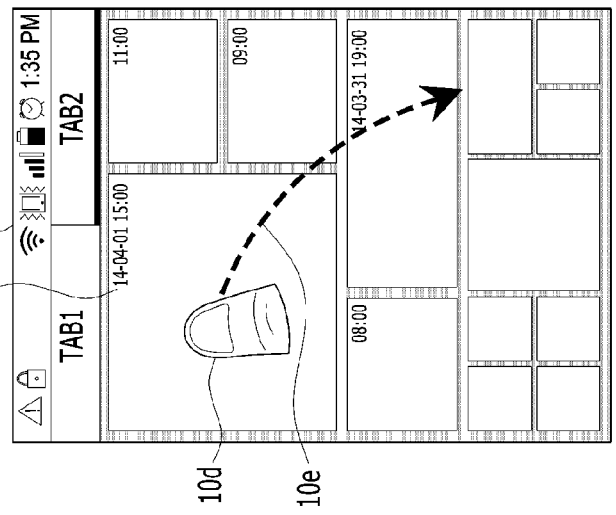

FIGS. 9A, 9B and 9C are diagrams for a controlling method of easily reading a plurality of image data included in a group thumbnail according to one embodiment of the present invention.

Referring to FIG. 9A, a grouping type list is currently displayed. If an input of a touch 10d and a drag 10e is applied to a $1^{st}$ group thumbnail 80-1, the controller 180 can sequentially display previews of a plurality of image data corresponding to the $1^{st}$ group thumbnail 80-1 on a path of the drag 10e.

Referring to FIG. 9B, if the touch 10d moves along the path of the drag 10e, a plurality of the image data 90-1 to 90-4 corresponding to the $1^{st}$ group thumbnail 80-1 can be sequentially displayed on the path.

If the drag 10e continues, referring to FIG. 9C, the controller 180 can increase the number of the image data displayed on the path.

FIGS. 10A and 10B are diagrams for a controlling method for a case of selecting a displayed image data according to one embodiment of the present invention.

Referring to FIG. 10A, in response to a touch drag input applied to a $1^{st}$ group thumbnail, the mobile terminal 100 currently displays previews for a plurality of image data. If a prescribed image data 90-3 is selected from a plurality of the displayed image data, referring to FIG. 10B, the controller 180 can display a detailed view screen 1001 of the selected image data 90-3.

Meanwhile, according to the above embodiment described with reference to FIGS. 10A and 10B, when a user releases the touch of the touch drag input, a plurality of the image data continue to be displayed, by which the present invention is non-limited. For instance, when the touch is released, a plurality of the image data may stop being displayed.

Meanwhile, according to one embodiment of the present invention, image data can be displayed on a map using a location information tag of the image data. Such an embodiment is described in detail with reference to FIGS. 11A to 11C as follows.

Figure 11A:
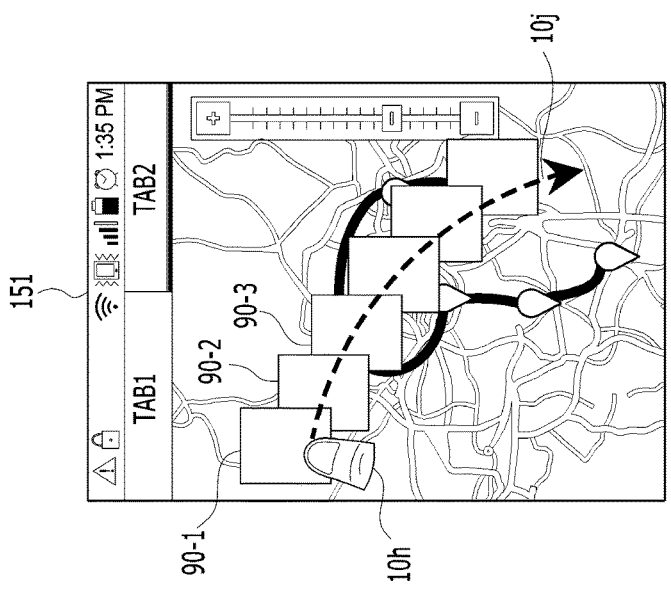
FIGS. 11A, 11B and 11C are diagrams for a controlling method of reading image data on a map according to one embodiment of the present invention.
Figure 11B:
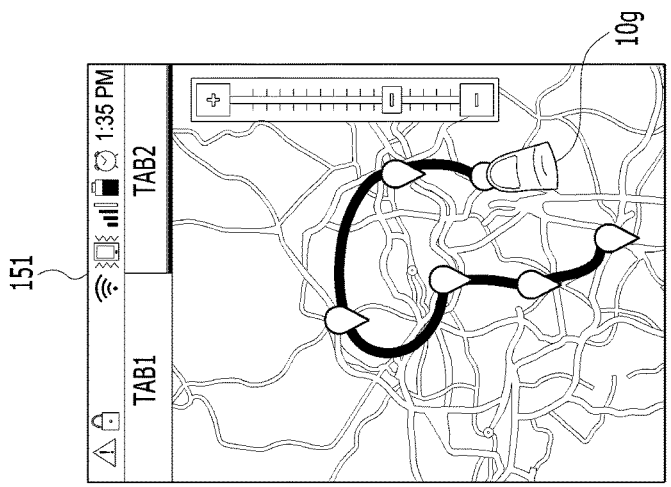
Figure 11C:
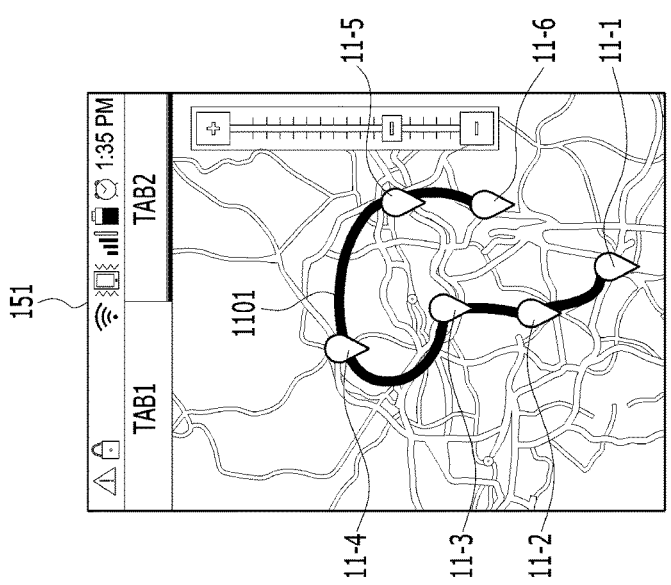

FIGS. 11A, 11B and 11C are diagrams for a controlling method of reading image data on a map according to one embodiment of the present invention.

Referring to FIGS. 11A to 11C, regarding each image data, a location information on a corresponding image data photographed location, can be saved as a location information tag. Hence, a prescribed indicator is outputted to a location of a location information tag on a map outputted through the touchscreen 151. If the prescribed indicator is selected, it is able to output an image data including the location information tag of the corresponding location.

Referring to FIG. 11A, the mobile terminal 100 currently outputs a map through the touchscreen 151. And, location indicators 11-1 to 11-6, each of which indicates that an image data having a location information tag of a corresponding point exists, are outputted to the map.

When photographing is performed at a location corresponding to each of the location indicators 11-1 to 11-6, if the mobile terminal 100 moves along a prescribed path, it is able to further output an indicator 1101 indicating that the mobile terminal 100 has moved.

After a prescribed location indicator 11-6 has been selected, if an input of a touch 10h and a drag 10j is received, the controller 180 can sequentially output a plurality of image data including a location information tag of the selected location indicator 11-6 along a path of the drag 10j. In this case, a plurality of the image data may be sequentially outputted along a distance of the applied drag 10j.

Meanwhile, an automatic scale adjustment controlling method mentioned in the following description can be applied to various kinds of lists as well as to a thumbnail list of image data. Such embodiments are described in detail with reference to FIGS. 12A to 12C and FIGS. 13A to 13C as follows.

FIGS. 12A, 12B and 12C are diagrams for a controlling method of changing a scale or display type in response to a scroll input on a news article reading screen according to one embodiment of the present invention.

Referring to FIG. 12A, the mobile terminal 100 currently outputs a prescribed news article through the touchscreen 151. If a scroll command for the news article 1201 is received, referring to FIG. 12B, the controller 180 can scroll to move the news article 1201. If the scroll command received plural times meets a grouping condition, referring to FIG. 12C, the controller 180 can output a list of news articles grouped per topic. According to the example shown in FIG. 12C, the displayed list may include items 1202-1 to 1202-3 corresponding to the news article.

The grouping condition may be set up with reference to a count of scroll inputs and/or a scroll speed like the aforementioned scale change condition.

Figure 13A:
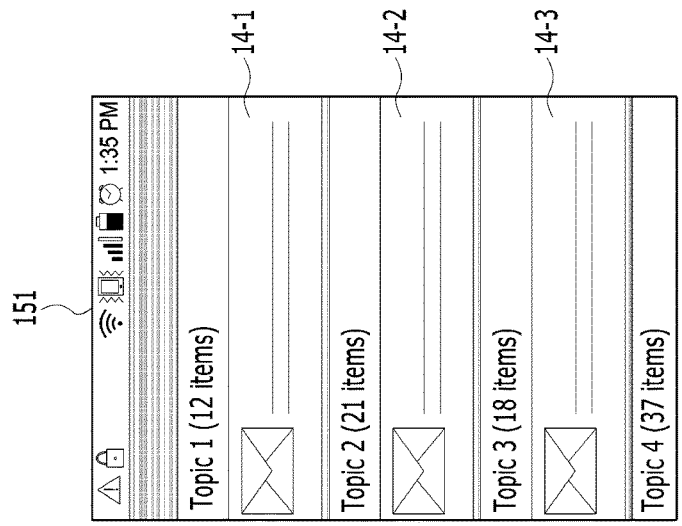
FIGS. 13A, 13B and 13C are diagrams for a controlling method of changing a scale or display type in response to a scroll input on an email list screen according to one embodiment of the present invention.
Figure 13B:
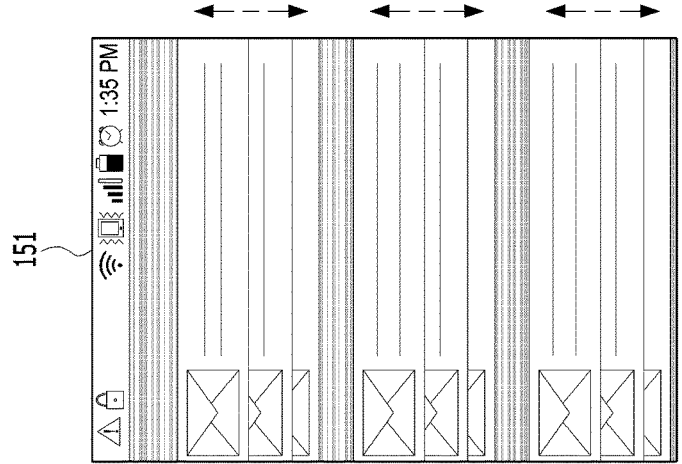
Figure 13C:
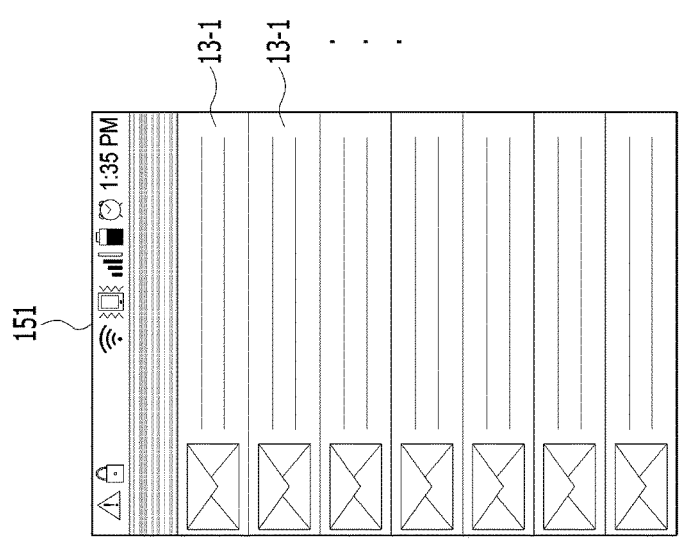

FIGS. 13A to 13C are diagrams for a controlling method of changing a scale or display type in response to a scroll input on an email list screen according to one embodiment of the present invention.

Referring to FIG. 13A, the mobile terminal 100 currently outputs an email list through the touchscreen 151. If a scroll command for the email list is received, referring to FIG. 13B, the controller 180 can scroll to move the email list. If the scroll command received plural times meets a grouping condition, referring to FIG. 13C, the controller 180 can output a list of emails grouped per topic. According to the example shown in FIG. 13C, the displayed list may include items 14-1 to 14-3 corresponding to the topics, respectively. Meanwhile, if a grouping condition is met, the email list can be changed into a grouping type list. In doing so, the controller 180 may output an animation effect in the course of changing the mail list into the grouping type list [cf. FIG. 13B].

Meanwhile, according to one embodiment of the present invention, proposed is a controlling method of inputting a search word for searching image data more easily. Such an embodiment is described in detail with reference to FIGS. 14A and 14B as follows.

Figure 14B:
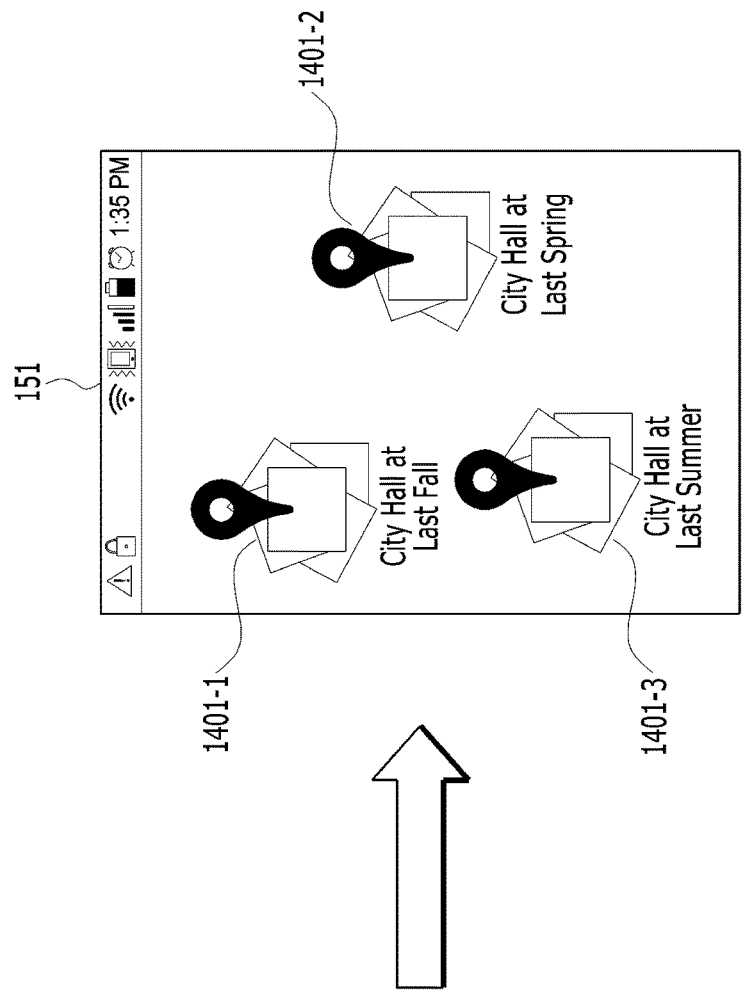
FIGS. 14A and 14B are diagrams for a controlling method of inputting a search word for searching image data through a touch input according to one embodiment of the present invention.
Figure 14A:
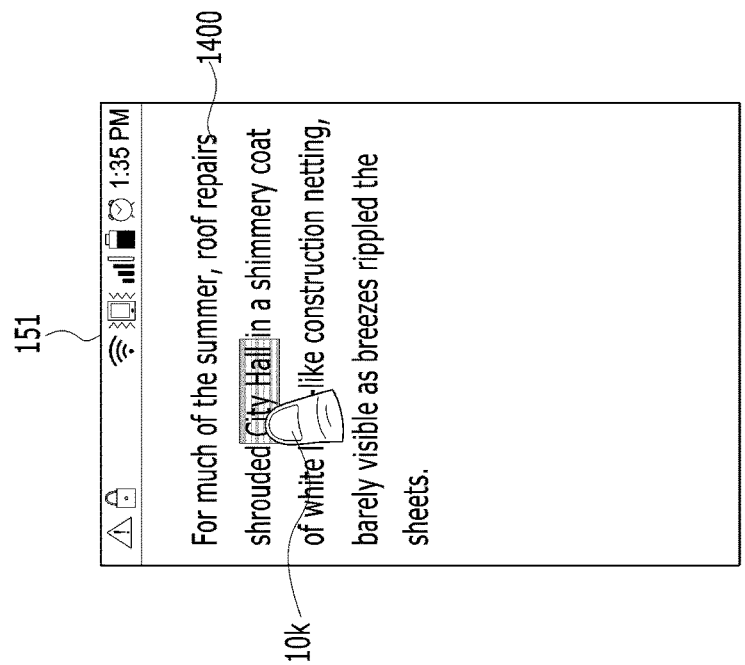

FIGS. 14A and 14B are diagrams for a controlling method of inputting a search word for searching image data through a touch input according to one embodiment of the present invention.

Referring to FIG. 14A, the controller 180 currently outputs a prescribed text data through the touchscreen 151. If an input of selecting a prescribed word from the text data is received, the controller 180 can search image data using the selected text data as a search word. In this case, the image data searching method using the search word may be identical to the former method using the voice recognition.

For instance, if a text 'City Hall' is selected form the outputted text data, the controller 180 searches/filters the image data including a location information tag of 'City Hall' and is then able to output a corresponding result as a grouping type list [FIG. 14B]. Referring to FIG. 14B, $1^{st}$ to $3^{rd}$ group thumbnails 1401-1 to 1401-3 for the image data including the location information tag of 'City Hall' are outputted.

According to the above embodiment, a case of displaying text data is taken as an example, by which the present invention is non-limited. For instance, the present invention is applicable to a case of recognizing a text existing on a displayed image data through OCR (optical character recognition).

Moreover, while another image data is read, if a recognized face is selected from the corresponding image data, the controller 180 searches for a contact corresponding to the selected face and is then able to provide the found contact to a user (e.g., contact information is displayed on the touchscreen). Subsequently, the user may make a phone call to the corresponding contact or text the corresponding contact.

Accordingly, embodiments of the present invention provide various effects and/or features.

According to at least one of embodiments of the present invention, an image data search can be facilitated.

According to at least one of embodiments of the present invention, a scroll operation can be adaptively performed during a scroll of a screen outputted through a touchscreen.

Various embodiments may be implemented using a machine-readable medium having instructions stored thereon for execution by a processor to perform various methods presented herein. Examples of possible machine-readable mediums include HDD (Hard Disk Drive), SSD (Solid State Disk), SDD (Silicon Disk Drive), ROM, RAM, CD-ROM, a magnetic tape, a floppy disk, an optical data storage device, the other types of storage mediums presented herein, and combinations thereof. If desired, the machine-readable medium may be realized in the form of a carrier wave (for example, a transmission over the Internet). The processor may include the controller 180 of the mobile terminal.

The foregoing embodiments are merely exemplary and are not to be considered as limiting the present disclosure. The present teachings can be readily applied to other types of methods and apparatuses. This description is intended to be illustrative, and not to limit the scope of the claims. Many alternatives, modifications, and variations will be apparent to those skilled in the art. The features, structures, methods, and other characteristics of the exemplary embodiments described herein may be combined in various ways to obtain additional and/or alternative exemplary embodiments.

As the present features may be embodied in several forms without departing from the characteristics thereof, it should also be understood that the above-described embodiments are not limited by any of the details of the foregoing description, unless otherwise specified, but rather should be considered broadly within its scope as defined in the appended claims, and therefore all changes and modifications that fall within the metes and bounds of the claims, or equivalents of such metes and bounds, are therefore intended to be embraced by the appended claims.

What is claimed is:

1. A mobile terminal comprising:
a memory configured to store image data;
a touchscreen; and
a controller configured to:
cause the touchscreen to display a plurality thumbnail images of a thumbnail image list based on the stored image data, wherein the plurality of thumbnail images are displayed at a first scale;
scrolling the plurality of thumbnail images when a scroll input is applied to the thumbnail image list at the touchscreen;
changing the displayed scale of the plurality of thumbnail images from the first scale to a second scale when the scroll input applied to the thumbnail image list meets a scale change condition; and
assigning the plurality of thumbnail images to at least one group and changing the displayed thumbnail image list to a grouping type list when the changed scale of the plurality of thumbnail images meets a threshold scale,
wherein the grouping type list includes at least one group having the plurality of thumbnail images, and
wherein when changing the displayed thumbnail image list to a grouping type list, a camera is activated and the displayed thumbnail image list is changed into the grouping type list based on a user face recognized through the activated camera.

2. The mobile terminal of claim 1, wherein the controller is further configured to:
cause the touchscreen to terminate the displaying of the plurality of thumbnail images and display a group of prescribed image data in response to a touch gesture received at the touchscreen.

3. The mobile terminal of claim 2, wherein the touch gesture comprises a touch input received at a displayed location of one image of the plurality of thumbnail images and a drag input that extends from the touch input in a right-left direction.

4. The mobile terminal of claim 1, wherein the controller is further configured to:
cause the touchscreen to display a preview of at least one image assigned to the at least one group of the grouping type list on a path of a drag input which is applied to the at least one group of the grouping type list.

5. The mobile terminal of claim 1, wherein the scale change condition comprises at least one of the scroll input received for a number of times that is equal to or greater than a prescribed number of times or the scroll input having a speed that is equal to or greater than a prescribed speed.

6. The mobile terminal of claim 1,
wherein the controller is further configured to:
activate the camera when the displayed scale of the plurality of thumbnail images is changed from the first scale to the second scale.

7. The mobile terminal of claim 1, further comprising:
a microphone, wherein the controller is further configured to:
search for a tag information of the stored image data based on a recognized voice that is received via the microphone; and
cause the touchscreen to display image data related to image data found according to the search for the tag information.

8. A method performed by a mobile terminal, the method comprising:
displaying, on a touchscreen, a plurality thumbnail images of a thumbnail image list based on stored image data, wherein the plurality of thumbnail images are displayed at a first scale;
scrolling the plurality of thumbnail images when a scroll input is applied to the thumbnail image list at the touchscreen;
changing the displayed scale of the plurality of thumbnail images from the first scale to a second scale when the scroll input applied to the thumbnail image list meets a scale change condition; and
assigning the plurality of thumbnail images to at least one group and changing the displayed thumbnail image list to a grouping type list when the changed scale of the plurality of thumbnail images meets a threshold scale,
wherein the grouping type list includes at least one group having the plurality of thumbnail images, and
wherein when changing the displayed thumbnail image list to a grouping type list, a camera is activated and the displayed thumbnail image list is changed into the grouping type list based on a user face recognized through the activated camera.

9. The method of claim 8, further comprising:
terminating the displaying of the plurality of thumbnail images and displaying a group of prescribed image data in response to a touch gesture received at the touchscreen.

10. The method of claim 9, wherein the touch gesture comprises a touch input received at a displayed location of one image of the plurality of thumbnail images and a drag input that extends from the touch input in a right-left direction.

11. The method of claim 8, further comprising:
displaying, on the touchscreen, a preview of at least one image assigned to the at least one group of the grouping type list on a path of a drag input which is applied to the at least one group of the grouping type list.

12. The method of claim 8, wherein the scale change condition comprises at least one of the scroll input received for a number of times that is equal to or greater than a prescribed number of times or the scroll input having a speed that is equal to or greater than a prescribed speed.

13. The method of claim 8, further comprising:
activating the camera when the displayed scale of the plurality of thumbnail images is changed from the first scale to the second scale.

14. The method of claim 8, further comprising:
searching for a tag information of the stored image data based on a recognized voice that is received via a microphone; and
displaying, on the touchscreen, image data related to image data found according to the search for the tag information.

* * * * *